United States Patent [19]

Maskovyak

[11] Patent Number: 5,065,314

[45] Date of Patent: Nov. 12, 1991

[54] METHOD AND CIRCUIT FOR AUTOMATICALLY COMMUNICATING IN TWO MODES THROUGH A BACKPLANE

[75] Inventor: George D. Maskovyak, Parma, Ohio

[73] Assignee: Allen-Bradley Company, Inc., Milwaukee, Wis.

[21] Appl. No.: 249,415

[22] Filed: Sep. 23, 1988

[51] Int. Cl.⁵ .............................................. G06F 13/38
[52] U.S. Cl. ................................. 395/325; 364/221; 364/222; 364/238.3; 364/239; 364/DIG. 1
[58] Field of Search ... 364/200 MS File, 900 MS File

[56] References Cited

U.S. PATENT DOCUMENTS

| | | | |
|---|---|---|---|
| 4,293,924 | 10/1981 | Struger et al. | 364/900 |
| 4,404,651 | 9/1983 | Grudowski | 364/900 |
| 4,413,319 | 11/1983 | Schultz et al. | 364/200 |
| 4,455,621 | 6/1984 | Pelley et al. | 364/900 |
| 4,691,296 | 9/1987 | Struger | 364/900 |
| 4,764,868 | 8/1988 | Ketelhut et al. | 364/200 |
| 4,769,771 | 9/1988 | Lippmann et al. | 364/200 |
| 4,807,178 | 2/1989 | Fujiwara et al. | 364/900 |
| 4,882,702 | 11/1989 | Struger et al. | 364/900 |
| 4,918,589 | 4/1990 | Floro et al. | 364/900 |
| 4,922,449 | 5/1990 | Donaldson et al. | 364/900 |
| 4,937,777 | 6/1990 | Flood et al. | 364/900 |

OTHER PUBLICATIONS

Goodenough, Frank, "Chips Isolate Host Processors From the Power They Control", *Electronic Design*, Jun. 23, 1988, pp. 52-58.

*Primary Examiner*—Gareth D. Shaw
*Assistant Examiner*—Maria Napiorkowski
*Attorney, Agent, or Firm*—Quarles & Brady

[57] ABSTRACT

A method and circuitry for communicating both byte transfer I/O data and file transfer I/O data to an individual I/O module through an equipment chassis backplane in a programmable controller. The byte transfer data is real time I/O data representing the status of I/O devices on an industrial machine or process. The file transfer data includes fault diagnostic data concerning conditions of the I/O devices in addition to their ON or OFF state. The circuitry is integrated into a single integrated circuit. The methods and circuitry are applicable to two different modes of addressing, one mode being used by earlier programmable controller processors and adapters and the other mode being used by newly developed processors and adapters.

9 Claims, 9 Drawing Sheets

METHOD AND CIRCUIT FOR AUTOMATICALLY COMMUNICATING IN TWO MODES THROUGH A BACKPLANE

BACKGROUND OF THE INVENTION

1. Field of the Invention

The field of the invention is I/0 modules for interfacing a machine or process to a programmable controller system processor.

2. Description of the Background Art

Certain I/O modules are classified as discrete I/O modules. These I/O modules convert signals for a set of discrete I/O devices on a controlled machine or process. The operation of a discrete I/O device is associated with a single (discrete) electrical signal. This signal is generated at two different signal levels to represent the ON state and the OFF state of an input device or to control the ON state or OFF state of an output device. Typical discrete input devices are pushbuttons, limit switches and relay contacts. Typical discrete output devices are solenoids, the energizing coils in electromagnetic relays and the actuating sections of solid state relays.

The digital values for discrete I/O devices can be grouped in 8-bit groups known as "bytes" and communicated to and from a programmable controller processor during an I/O scan routine in which each I/O module is addressed in turn for I/O data transfer.

The term "word" as used in this document is a broad term encompassing data groups of four bits, eight bits, sixteen bits, two bytes or other sizes used in the computer arts, while the term "byte" refers to a word of data with a specific size of 8 bits.

The term "file" shall refer to a group of data with two or more bytes of data associated with a single starting address in memory or a single I/O address.

Another category of I/O modules known in the art of programmable controllers are word-oriented I/O modules. These require conversion of an AC or DC analog signal level to at least an 8-bit digital value and sometimes to 10-bit and 12-bit digital values. With the introduction of word-oriented modules, additional methods of I/O communication have been developed to transfer many bytes of I/O data in a single block or file between a individual I/O module and the programmable controller processor.

Struger et al., U.S. Pat. No. 4,293,924, issued Oct. 6, 1981, discloses a word-oriented I/O module that communicates multi-byte blocks or files of real time I/O data through a backplane. The module of Struger et al. was switch-selectable to operate in another mode, referred to as the single transfer mode, to alternately transfer bytes incorporating channel select data and bytes of real time I/O data. The module of Struger et al. was operable in either the block transfer mode or the single transfer mode, and was not operable in both modes during the same period of controller operation. The controller was stopped and a switch on the module was reset to change from one mode of I/O communication to the other. There was no complementary relationship between the real time I/O data communicated in one mode and the real time I/O data transmitted in the other mode. It was the same data communicated in two different ways.

More recently, in Struger et al., U.S. Pat. No. 4,691,296, issued Sept. 1, 1987, I/O modules have communicated bytes of discrete I/O data in more than one mode of operation.

The foregoing knowledge in the art, however, has not suggested automatically communicating data in a byte transfer mode and a file transfer mode to an individual I/O module. The knowledge in the art has not suggested transferring discrete I/O data indicating the ON or OFF state of the I/O devices in the first transfer mode and transferring a multibyte block or file of diagnostic data in the second transfer mode.

Word-oriented I/O modules of the type disclosed in Struger et al., U.S. Pat. No. 4,293,924, cited above, have included a programmed microprocessor and some other circuit components such as latches, which were read by the microprocessor to transfer each byte of data through the backplane during an overall communication sequence. If some method or circuit could be devised to relieve the microprocessor of this backplane communication task, the microprocessor could better concentrate on processing control tasks related to the specialized I/O circuitry linking the microprocessor to the I/O devices on the customer's machine or process.

SUMMARY OF THE INVENTION

The invention generally relates to a method and circuitry for communicating both byte transfer I/O data and file transfer I/O data to an individual I/O module through an equipment chassis backplane.

The invention more particularly relates to an I/O module which transfers discrete I/O data for eight bidirectional I/O points, where each point is connectable to both an input device and an output device. The I/O module communicates in a byte transfer mode and also communicates a file of diagnostic data in a file transfer mode. The file of diagnostic data includes a byte of diagnostic data capacity for each input and a byte of diagnostic capacity for each output or as many as sixteen bytes.

The invention also relates to modifying the response of an I/O module to I/O scanning signals to allow a byte transfer system address and a file transfer system address to reside on the same I/O module without changing the signal generating capabilities of existing processors, I/O scanners and I/O adapters. With the methods and circuitry of the invention both prior communication modules and newer communication modules specifically designed for use with the I/O modules of the invention can be utilized.

The invention also relates to a specific integrated circuit for handling all backplane communication tasks for a processor-based I/O module thereby allowing the processor of the I/O module to concentrate on executing tasks related to the I/O circuits controlling and monitoring the I/O devices on the customer's machine or process.

The integrated circuit more particularly includes byte transfer circuitry for storing and transferring discrete I/O data to be transferred in the byte transfer mode, file transfer circuitry for storing and transferring I/O data to be transferred in the file transfer mode, backplane enable circuitry responsive to one of the module enable signals generated on the backplane to select the integrated circuit for transfer of I/O data, and a byte decoding and enabling subcircuit included in the backplane enable circuitry. The byte decoding and enabling subcircuit is responsive to a second backplane signal in a first logic state for enabling transfer of a byte of I/O data between the byte transfer circuitry and the backplane. The byte decoding and enabling subcircuit is also responsive to the second backplane signal in a second logic state for enabling transfer of a file of I/O data between the file transfer circuitry and the backplane.

The integrated circuit is operable in a first mode for earlier programmable controller processors and adapters, in which the second backplane signal is a byte address signal that is decoded to generate a signal for file transfer in a first logic state. The integrated circuit is also operable in a second mode for newly developed processors and adapters.

In the second mode, the second backplane signal is a signal under the program control of a programmable controller processor (with or without an adapter module in the communication path to the I/O module). Discrete I/O transfer and file transfer are made to the same system I/O address. A system-level programming instruction is executed to generate the second backplane signal in the second logic state to initiate a file transfer. Without such execution, the second backplane signal remains in a first logic state to allow a byte transfer of discrete I/O data.

Other objects and advantages besides those discussed above shall be apparent to those skilled in the art from the description of a preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENT

A. The Programmable Controller System

Figure 1:
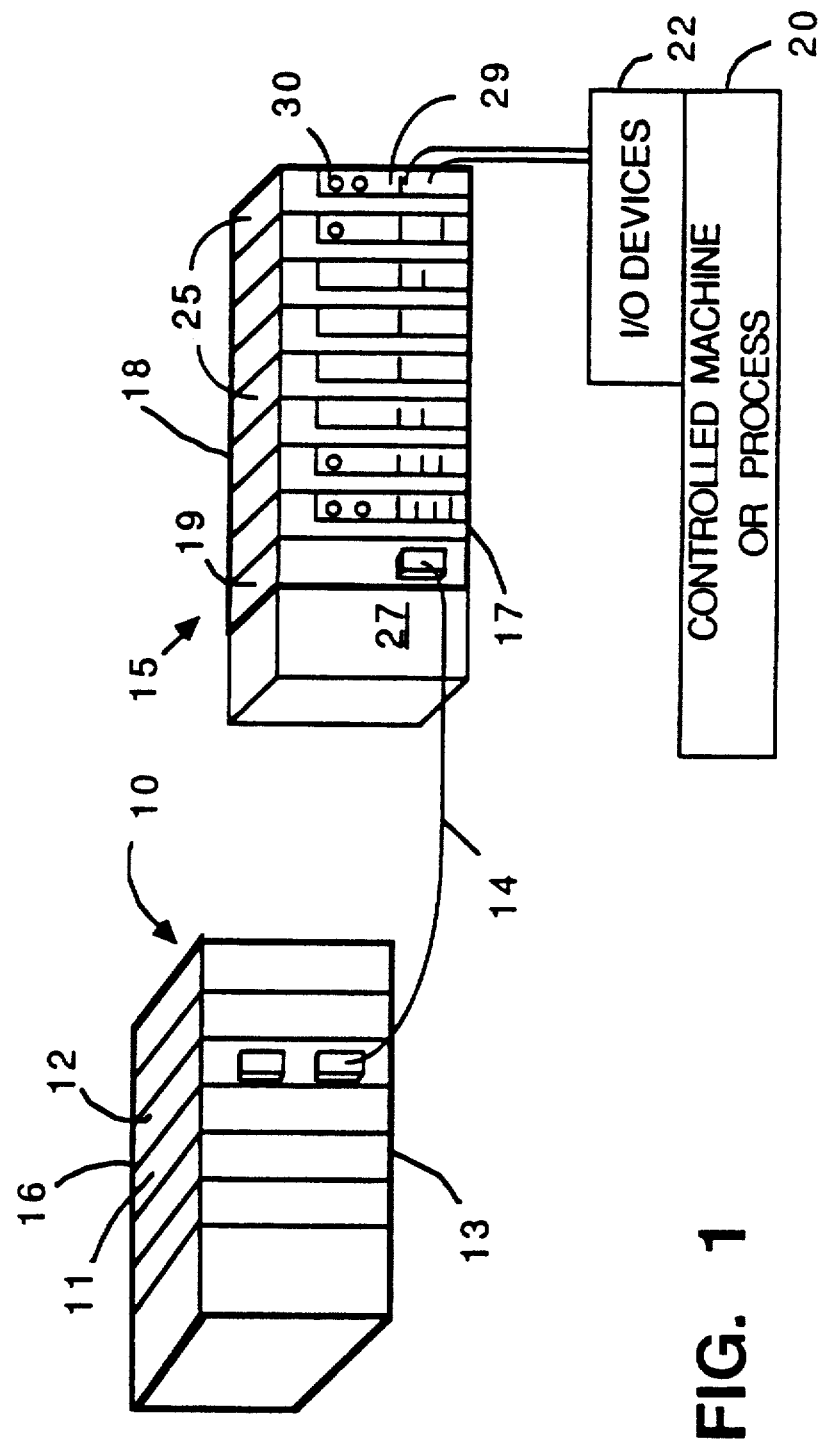
FIG. 1 is a perspective view of a modular programmable controller system which includes the circuitry of the present invention.

In FIG. 1, a programmable controller (PC) system includes a modularized PC system processor unit 10 having a group of modules supported and connected in a system chassis 13 (schematically represented by heavy line). One of these modules is a PC system processor module 11 for executing user application programs to control a machine or process 20. With earlier controllers these application programs were seen on the screen of programming terminals as "ladder diagrams". In recent years, however, other symbolic user application languages have been developed. The user application program applies control logic in examining input data and setting output data in an I/O image table. The output data and input data are communicated to and from the I/O devices 22 to carry out the actual sensing and controlling of conditions on the machine or process 20. Input data represents the sensed state or condition of input devices 22 on the machine or process 20, while output data represents the commanded state or condition of output devices 22 on the machine or process 20. The more general term "I/O devices" shall refer to input devices or output devices, or a combination of the two, and the more general term "I/O data" shall mean input data or output data or a combination of the two.

To effect control of the I/O devices 22, the processor module 11 sends output data and receives input data through a communication path to and from the I/O devices 22. This communication path includes a system backplane 16 connecting the PC system processor module 11 to an I/O scanner module 12, which further communicates data through a serial data link 14 to a remote I/O adapter module 19 in a remote I/O unit 15. The I/O adapter module 19 and a group of I/O modules 25 are inserted into physical slots in an I/O chassis (represented schematically by the heavy line) and connect through back edge connectors (not shown) on a backplane circuit board 18 extending across the back of the I/O chassis 17. The I/O adapter module 19 is located in the leftmost slot and eight I/O modules 25 are placed in eight slots to the right of the I/O adapter module 19. A power supply 27 is mounted on the left sidewall of the I/O chassis 17.

The machine or process 20 is controlled through the I/O devices 22 which are electrical and electromechanical devices such as relays, solenoids, limit switches, motor starters and pushbuttons. These devices are connected by individual wires to terminals on front edge connectors 29. The front edge connectors 29 are electrically and mechanically connected to the front edges of circuit boards (not shown) which are exposed along the front sides of the I/O modules 25. The I/O modules 25 include LED's 30, located above the connectors 29 for signalling the status of certain outputs as being ON or OFF.

The system configuration in FIG. 1 is that of a programmable controller system with one remote I/O unit 15. It should be understood that in another well known configuration of programmable controller, a system processor module of the type for executing a user application program is placed in the slot occupied in FIG. 1 by the adapter module 19. This provides a smaller, local programmable controller, for use either as a stand-alone unit or for use as a local controller in a multi-tier programmable controller system. As used herein, the term "backplane controller" shall mean either a system processor or an adapter module operating in the leftmost slot of the I/O chassis 17 to generate signals on the backplane 18. It should also be understood that I/O units 15 are available in other sizes, one size for accommodating four I/O modules and another size for accommodating sixteen I/O modules.

B. Operation of the I/O Module

Typical input and output modules provide five broad functions for a programmable controller system. First, I/O modules provide physical connection between the I/O devices on the controlled machine or process and the programmable controller. Second, I/O modules provide signal-level conversion between the AC or DC signals used by the I/O devices and the electronic signals used within the programmable controller system. Third, the I/O modules provide a human observer with a visual indication of the operation of the electronic circuitry. Fourth, the I/O modules provide an isolation interface between the power signals on the controlled machine or process and the electronic signals within the controller. And fifth, the I/O modules provide multiplex electronics to construct "pictures" or "maps" of conditions of the I/O devices 22 and of the system processor's decisions and actions.

The first function, the physical connection between the I/O devices 22 and the programmable controller is provided by the connectors 29 in FIG. 1. The third function, visual status indication, is provided by the LED's 30 in FIG. 1.

Figure 2:
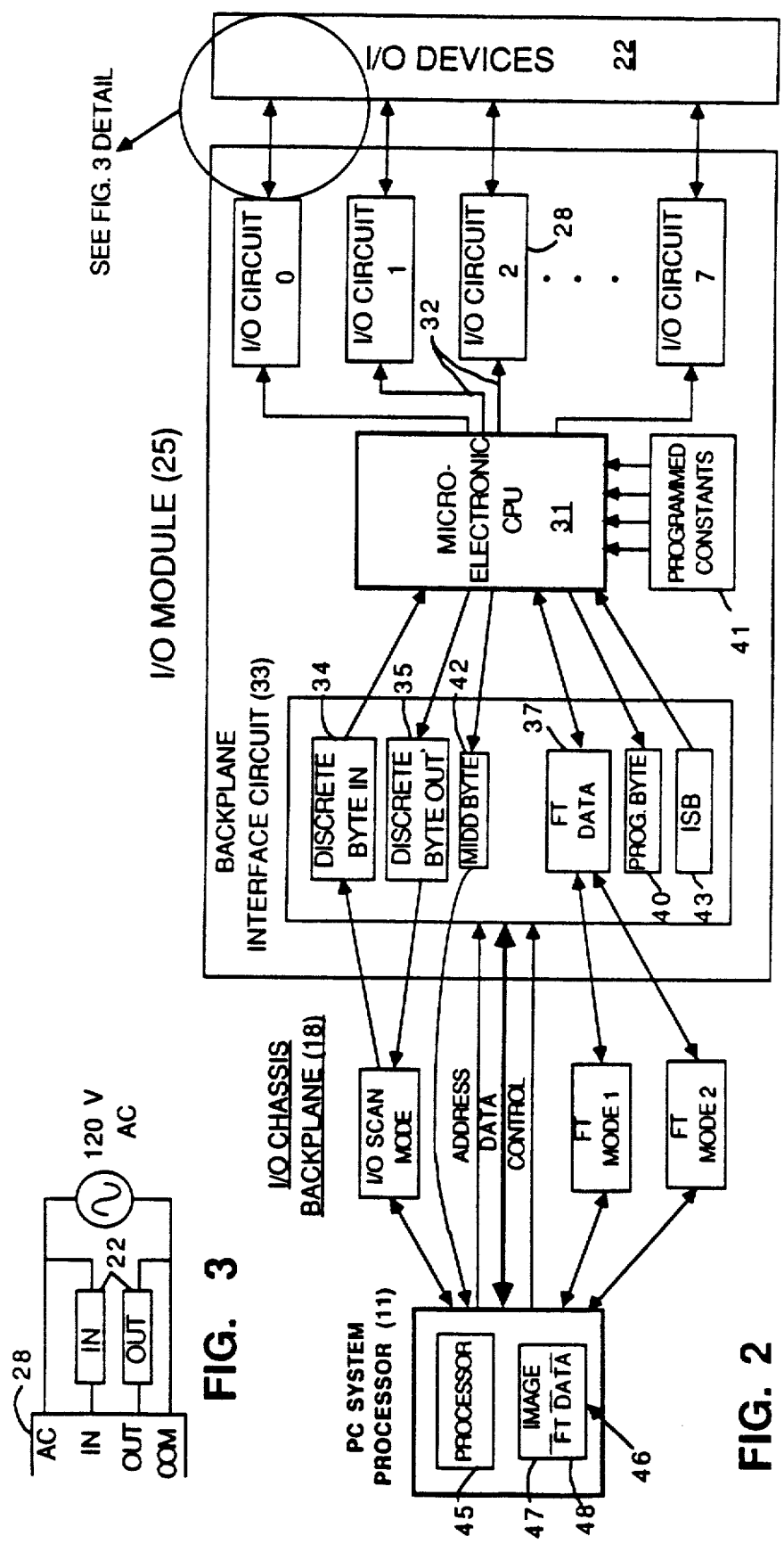
FIG. 2 is a block diagram of an I/O module in FIG. 1 which incorporates of circuitry of the present invention.
Figure 3:
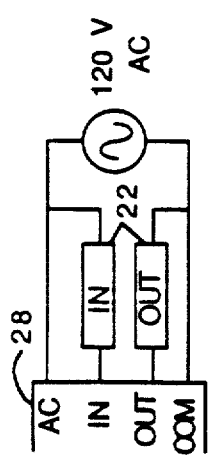
FIG. 3 is a detailed view of a connection shown in FIG. 2.

The second and fourth functions for the I/O module, signal-level conversion and electrical isolation, are provided by eight bidirectional I/O circuits 28 (I/O CIRCUITS 0-7) seen in FIG. 2. In an AC embodiment of an I/O module, I/O CIRCUITS 0-7 sense the ON or OFF state of input devices and control the ON or OFF state of output devices supplied with a nominal AC voltage of 120 AC volts. FIG. 3 shows that each I/O circuit 28 has two inputs (AC and COM) for receiving the 120-volt AC signal as well as an input (IN) for connection to the low side of an input device 22 and an output (OUT) for connection to the high side of the output device 22. The invention is also applicable to I/O modules in which the input and output devices are powered from a DC source with a nominal DC voltage of 24 volts (low range of operation) or a nominal DC voltage of 48 DC volts (high range of operation).

The I/O circuits 28 are bidirectional in that each circuit can sense one input and control one output. Because the I/O circuits 28 sense and control input and output devices with individual operating signals, the data or digital signals which are converted to and from these operating signals are referred to as "discrete" I/O data. The I/O circuits 28 are also sometimes referred to as I/O points (for connection of I/O devices). In this example, there are eight output and eight inputs on the I/O module 25, and these can be considered as eight bidirectional I/O points or sixteen unidirectional I/O points.

A microelectronic CPU 31 is connected through eight line sets 32 to the eight respective I/O circuits 28. Each line set 32 includes a line for serial transmission of data and lines for a group of control signals such as system clock, read clock, write clock, program/run mode and chip enable. The microelectronic CPU 31 simultaneously reads or writes eight bits—one bit for each of the I/O circuits 28. It reads or writes to the I/O circuits 28 eight times to transfer a byte for each I/O circuit. For a detailed description of the I/O circuits, reference is made to an article of Frank Goodenough entitled "Chips Isolate Host Processors from the Power They Control" in *Electronic Design*, June 23, 1988, issue, pages 52-58.

The commercial circuit used as the microelectronic CPU (central processing unit) 31 in the preferred embodiment is the 80C31 Microcomputer manufactured and sold by Intel Corporation, Santa Clara, Calif. This circuit has 128 bytes of random access memory on-board for storing temporary data and results. The CPU is operated under the direction of a program stored in a programmable read only memory (PROM) (not shown). Manuals describing the architecture, operation and programming of this circuit are available in the form of commercial literature from Intel and in other publications. It is contemplated that in other embodiments other commercial CPU's will be used.

The microelectronic CPU 31 communicates in three modes with I/O CIRCUITS 0-7: 1) a program mode, 2) a run output mode and 3) a run input (diagnostic) mode. In the program mode, each I/O circuit 28 receives a serially transmitted programming byte from the CPU 31. The programming byte includes bits which are defined as seen in the following Table 1.

TABLE 1

| \multicolumn{2}{c}{PROGRAMMING BYTE TO I/O CIRCUITS (28)} | |
|---|---|
| BIT | DESCRIPTION |
| 0 | Voltage Range Select (DC) |
|   | 0 = Low Range (24 V DC) |
|   | 1 = High Range (48 V DC) |
|   | In AC module bit is always zero |
| 1,2 | Input Filter Time Constant |
|   | 00 = 25 msec (AC)/125 μsec(DC) |
|   | 01 = 50 msec (AC)/1 msec (DC) |
|   | 10 = 75 msec (AC)/4 msec (DC) |
|   | 11 = 100 msec (AC)/16 msec (DC) |
| 3,4 | Output Overcurrent Level Select |
|   | 00 = 3.1 Amps Peak(AC)/2.4 Amps Peak(DC) |
|   | 01 = 6.0 Amps Peak(AC)/4.0 Amps Peak(DC) |
|   | 10 = 17 Amps Peak(AC)/12 Amps Peak(DC) |
|   | 01 = 28 Amps Peak(AC)/20 Amps Peak(DC) |
| 5 | Output Fault Mode |
|   | 0 = Maintain Last State |
|   | 1 = Reset Output |
| 6,7 | Not Used |

The microelectronic CPU 31 determines the bits for the programming bytes (not shown in FIG. 2) to be sent to the I/O circuits 28 based on I/O configuration bytes which the CPU 31 receives from the system processor 11. The I/O configuration bytes are received from the system processor as the low bytes of 16-bit words in a 8×16-bit file. This file is transferred from the CPU 31 via one of the file transfer modes to be described below. An I/O configuration byte from the CPU 31 and applicable to one I/O circuit 28 is defined in Table 2 below.

TABLE 2

| \multicolumn{2}{c}{I/O CONFIGURATION BYTE FROM SYSTEM PROCESSOR} | |
|---|---|
| BIT | DESCRIPTION |
| 0 | Output Fault Mode |
|   | 0 = Maintain Last State |
|   | 1 = Reset Output |
| 1,2 | Input Filter Time Constant |
|   | 00 = 25 msec (AC)/125 μsec(DC) |
|   | 01 = 50 msec (AC)/1 msec (DC) |
|   | 10 = 75 msec (AC)/4 msec (DC) |
|   | 11 = 100 msec (AC)/16 msec (DC) |
| 3 | Output Pulse Test Enable |
|   | 0 = Disabled |
|   | 1 = Enabled |
| 4 | Output Wire Disconnect Enable |
|   | 0 = Disable |
|   | 1 = Enable |
| 5 | Input Wire Disconnect Enable |
|   | 0 = Disable |
|   | 1 = Enable |
| 6,7 | Not Used |

Comparing Tables 1 and 2, the input filter time constant (bits 1 and 2) is passed through the microelectrnoic CPU 31 to the I/O circuits 28. The output fault mode bit is also passed through the microelectronic CPU 31 but its bit position is changed from bit 0 in Table 2 to bit 5 in Table 1. The output pulse test mentioned in Table 2 is a test to reverse the state of an output circuit for 100 microseconds to insure the the output driver in the I/O circuit 28 is functioning properly. This parameter is not seen in Table 1 because it is transmitted to the I/O devices 22 in the run output mode, which will be defined in relation to Table 3 below.

The "input wire disconnect" test and the "output wire disconnect" test are tests to determine whether an input device 22 or an output device 22 has become disconnected from the terminals on the swing arm connectors 29 in FIG. 1. I/O CIRCUITS 0-7 are wired to provide a small residual current even when an I/O device 22 in the OFF state. Loss of this residual current means that the I/O device 22 has become disconnected. The I/O configuration bytes sent to the microelectronic CPU 31 contain bits to enable these tests, but the actual data resulting from the tests is read during the run input (diagnostic) mode, so there are no bits to send to the I/O circuits 28 in the programming bytes of Table 1.

The microelectronic CPU 31 transmits several serial bits to each of the I/O circuits 28 in the run output mode and these are defined in Table 3 as follows.

TABLE 3

| RUN OUTPUT MODE BITS TO I/O CIRCUITS | |
|---|---|
| BIT PATTERN | DESCRIPTION |
| 001 | TURN OUTPUT OFF |
| 110 | TURN OUTPUT ON |
| 011 | PULSE TEST |

In the run mode, each I/O circuit 28 responds to the above bit patterns by sending an input byte back to the microelectronic CPU 31. The input byte includes the ON or OFF state of any input device 22 connected to the I/O circuit 28 in the "bit 0" position of this input byte. Diagnostic bits for the input device, which are to be distinguished from the ON and OFF state data, are included as "bits 1-6" in the input byte. A parity bit for checking data transmission is included as "bit 7" in the input byte as seen in the following Table 4.

TABLE 4

| DIAGNOSTIC BYTE FROM I/O CIRCUITS | |
|---|---|
| BIT | DESCRIPTION |
| 0 | ON or OFF state of input |
| | 0 = OFF |
| | 1 = ON |
| 1 | Input Wire Disconnected |
| | 0 = No |
| | 1 = Yes |
| 2 | Communications Fault |
| | 0 = No fault |
| | 1 = Not receiving data from processor |
| 3 | Output Wire Disconnected |
| | 0 = No |
| | 1 = Yes |
| 4 | Output Overcurrent |
| | 0 = No |
| | 1 = Yes |
| 5 | Output Overtemperature |
| | 0 = No |
| | 1 = Yes |
| 6 | Output Failed to Follow Command |
| | 0 = No |
| | 1 = Yes |

TABLE 4-continued

| DIAGNOSTIC BYTE FROM I/O CIRCUITS | |
|---|---|
| BIT | DESCRIPTION |
| 7 | Odd Parity Bit |

The microelectronic CPU 31 forms an 8×16-bit file of diagnostic data based on the input data read from the I/O circuits 28. The high byte in each 16-bit word is not utilized. The low byte of each 16-bit word is a diagnostic byte for the set of I/O circuits 28. The diagnostic bytes are bit-mapped to report one condition for each of the eight I/O circuits. Thus the low bytes of the diagnostic file are defined as seen in the following Table 5.

TABLE 5

| DIAGNOSTIC BYTES FROM I/O CPU (31) | |
|---|---|
| LOW BYTE | DESCRIPTION |
| Word 1 | Diagnostic Information Byte |
| Word 2 | Input Wire Disconnected (8 inputs) |
| | 0's = No |
| | 1's = Yes |
| Word 3 | Communications Fault (8 outputs) |
| | 0's = No fault |
| | 1's = Not receiving data from processor |
| Word 4 | Output Wire Disconnected (8 outputs) |
| | 0's = No |
| | 1's = Yes |
| Word 5 | Output Overcurrent (8 outputs) |
| | 0's = No |
| | 1's = Yes |
| Word 6 | Output Overtemperature (8 outputs) |
| | 0's = No |
| | 1's = Yes |
| Word 7 | Pulse Test Failed (8 outputs) |
| | 0's = Yes |
| | 1's = No |
| Word 8 | Output Failed to Follow Command (8) |
| | 0's = No |
| | 1's = Yes |

The Diagnostic Information Byte summarizes the various conditions that can occur and identifies the applicable conditions without identifying their specific location. The bit-mapped bytes in Words 2-8 in Table 5 identify the particular I/O location of the condition. The diagnostic information byte in Word 1 in Table 5 is defined as seen in Table 6 below.

TABLE 6

| DIAGNOSTIC INFORMATION BYTE | |
|---|---|
| BIT | DESCRIPTION |
| 0 | Low AC Power Line Voltage |
| | (AC I/O circuits only) |
| | 0 = Within Range of AC Power Specs. |
| | 1 = Out of Range or AC Power Specs. |
| 1 | Input Wire Disconnected |
| | 0 = No |
| | 1 = Yes |
| 2 | Communications Fault |
| | 0 = No fault |
| | 1 = Not receiving data from processor |
| 3 | Output Wire Disconnect |
| | 0 = No |
| | 1 = Yes |
| 4 | Output Overcurrent |
| | 0 = No |
| | 1 = Yes |
| 5 | Output Overtemperature |
| | 0 = No |
| | 1 = Yes |
| 6 | Output Failed to Follow Command |
| | 0 = No |
| | 1 = Yes |
| 7 | Pulse Test Failed |

TABLE 6-continued

| DIAGNOSTIC INFORMATION BYTE | |
|---|---|
| BIT | DESCRIPTION |
| | 0 = Yes |
| | 1 = No |

In processing the data transmitted to and receive from I/O circuits 0-7, the microelectronic CPU 31 performs the fifth function mentioned above for I/O modules, multiplexing and demultiplexing the real time I/O data to and from the I/O image table to provide high speed "pictures" or "maps" of conditions of the I/O devices 22 and of the system processor's decisions and actions.

The microelectronic CPU 31 multiplexes or combines the eight bits of discrete input data from the eight I/O circuits 28 into a single byte of discrete I/O data. This byte is then sent over a parallel data bus in a single transmission or time frame. The microelectronic CPU 31 also receives a byte of discrete output data over a parallel data bus in a single transmission or time frame. The CPU 31 then demultiplexes or distributes the eight bits to the eight respective I/O CIRCUITS 0-7.

In this example the discrete I/O data is handled as "single byte" transfer data. This single byte data is subject to a higher frequency of communication with the PC system processor 11 than the file transfer data. This is because the discrete I/O data is controlling an operating machine or process in real time. In order for the controller to be "faster" than the mechanical activities on the machine or process, discrete I/O data must be communicated at a high frequency. The update rate for addressing all I/O modules in a programmable controller system is referred to as the I/O scan rate. There may also be longer update rates or scan rates for actually transferring files of data to a filetransfer type module.

The microelectronic CPU 31 also reads in the diagnostic bytes from the respective I/O CIRCUITS 0-7, extracts the applicable data and packs it into eight bytes of a sixteenbyte file to be sent back to the PC system processor 11.

The microelectronic CPU 31 receives a file including eight programming bytes, extracts the applicable data and distributes it to the respective I/O CIRCUITS 0-7.

The programming and diagnostic data is communicated through the backplane as file transfer data which it requires less frequent communication to and from the PC system processor 11 than the discrete I/O data.

A backplane interface circuit 33 relieves the microelectronic CPU 31 of many functions related to communication with a PC system processor 11 or an adapter module 19 through the I/O chassis backplane 18.

The microelectronic CPU 31 reads and writes bytes of discrete I/O data 34, 35 to the backplane interface circuit 33, and the backplane interface circuit 33 transfers the discrete I/O data in a two-way signalling sequence referred to as the I/O SCAN mode of I/O communication 36.

The microelectronic CPU 31 also exchanges files of file transfer (FT) data 37 in either direction with the backplane interface circuit 33. These files 37 contain the programming bytes and diagnostic bytes for I/O CIRCUITS 0-7. The backplane interface circuit 33 handles matters of timing and protocol related to the file transfer through the backplane 18. The backplane interface circuit 33 further performs the file transfer in two different modes, FT Mode 1 and FT Mode 2, which are represented in FIG. 2. For reasons of equipment compatibility, these two modes use different signals on the backplane 18.

While the microelectronic CPU 31 is relieved of many of the details of communication, it retains control over the backplane interface circuit 33 by initiating certain actions and providing certain responses during backplane communication.

Figure 5:
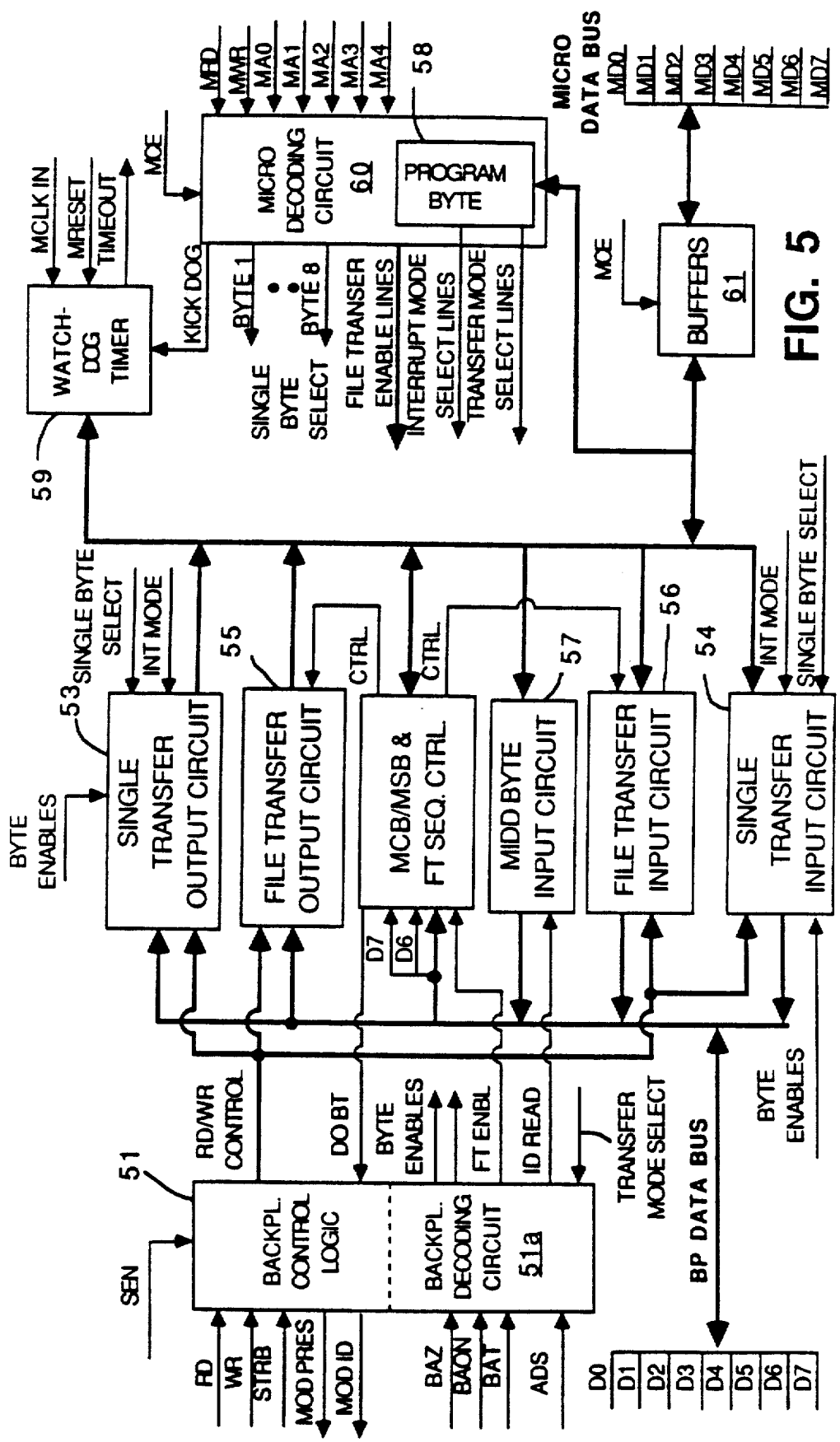
FIG. 5 is block diagram of the backplane circuit of FIG. 3.

During startup and initialization of the I/O module 25, the microelectronic CPU 31 sends a backplane programming byte 40 to the backplane interface circuit 33. The microelectronic CPU 31 originates the programming byte in response to parameters which it reads as constants from programmable read only memory (PROM) 41. The programming byte 40 from the microelectronic CPU 31 is "dead ended" (communicated no further) on the backplane interface circuit 33, where it is latched in hardware to generate a set of logic signals referred to as "transfer mode select" signals and "interrupt mode" select signals. These are conveyed on TRANSFER MODE SELECT lines in FIG. 5 to the backplane decoding circuit 51. The INTERRUPT MODE SELECT lines connect to an interrupt generator circuit 98 in FIGS. 8 and 9 to select conditions during single byte transfer mode when interrupt signals will be generated to the CPU 31. The programming byte which is loaded in the program byte latch 58 in FIG. 5 is defined as seen in Table 7 below.

TABLE 7

| PROGRAMMING BYTE FROM CPU (31) TO BACKPLANE INTERFACE CIRCUIT (33) | |
|---|---|
| BIT | DESCRIPTION |
| 0 | File Transfer Mode |
| | 0 = FT Mode 1 |
| | 1 = FT Mode 2 |
| 1,2 | File Transfer Mode/Bytes-Single Transfer |
| | 00 = FT Mode 1 only/ 0 bytes |
| | 01 = FT Mode 1/ 2 bytes |
| | 10 = FT Mode 1/ 4 bytes |
| | 11 = FT Mode 1/ 8 bytes |
| 3 | Debug (Interrupt on FT Data Complete) |
| | 0 = OFF |
| | 1 = ON |
| 4 | Interrupt for each 2 bytes sent to backplane controller |
| | 0 = Disable |
| | 1 = Enable |
| 5 | Interrupt when all single transfer bytes sent to backplane controller |
| | 0 = Disable |
| | 1 = Enable |
| 6 | Interrupt when all single transfer bytes received from backplane controller |
| | 0 = Disable |
| | 1 = Enable |
| 7 | Interrupt when 2 bytes received from backplane controller |
| | 0 = Disable |
| | 1 = Enable |

As seen in Table 7, bit 0 determines whether FT Mode 1 of FT Mode 2 is to be used to communicate file transfer data through the backplane. Where FT Mode 1 is selected, there are several different possible capacities for single transfer data and these are determined by bits 1 and 2. Where FT Mode 2 is selected, the 8-byte capacity for single transfer data is also selected. The present I/O module 25, for example requires only a 2-byte capacity for single byte transfers. When the I/O module 25 is used with existing system processors and adapters, the address of the first single byte becomes the address for transfer of file data and the address for the second single byte becomes the address for transfer of discrete I/O data.

The I/O module 25 may signal the backplane controller that I/O data is ready for transfer by transferring a module identification and diagnostics (MIDD) byte 42. This byte is originated by the CPU 31 and sent to circuit 33 for further communication to the backplane 18. This byte is used when the circuit 33 has been programmed for file transfer in FT Mode 2. While several MIDD bytes are possible, only one byte, referred to as "MIDD Byte 0" will be described for this example. This byte is defined as seen in the following Table 8.

TABLE 8

| BIT | MIDD BYTE 0 DESCRIPTION |
|---|---|
| 0 | I/O Module Functional<br>0 = NO<br>1 = YES |
| 1 | Request Programming File Transfer from Backplane Controller<br>0 = NO<br>1 = YES |
| 2 | Request Diagnostic Data File Transfer be sent to Backplane Controller<br>0 = NO<br>1 = YES |
| 3 | Discrete Input Data Present<br>0 = NO<br>1 = YES |
| 4 | Discrete Output Data Present<br>0 = NO<br>1 = YES |
| 5 | FT Mode Transfer Type Module<br>0 = NO<br>1 = YES |
| 6,7 | Single Transfer Capacities<br>00 = 1 byte<br>01 = 2 bytes<br>10 = 4 bytes<br>11 = 8 bytes |

MIDD Byte 0 indicates in bits 0 through 2 whether the I/O module is ready to receive or send programming and diagnostic data through the backplane. Bits 3 and 4 signal the presence of discrete I/O data for transfer in the single byte transfer mode. Bit 5 signals whether the module is a file transfer type module and bits 6 and 7 indicate the single byte transfer capacities.

Figure 8:
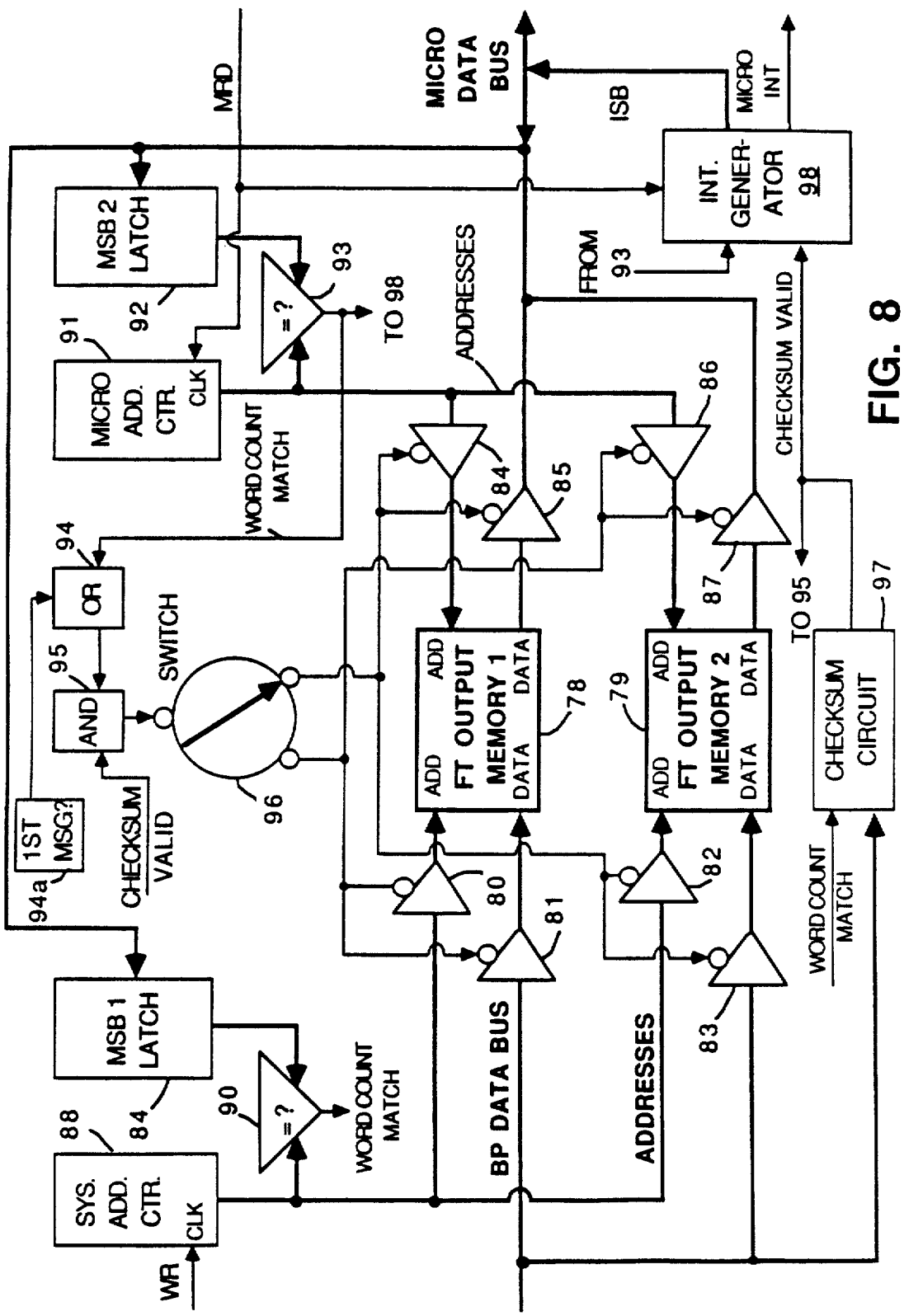
FIG. 8 is a block diagram of a file transfer output circuit seen in FIG. 5.
Figure 9:
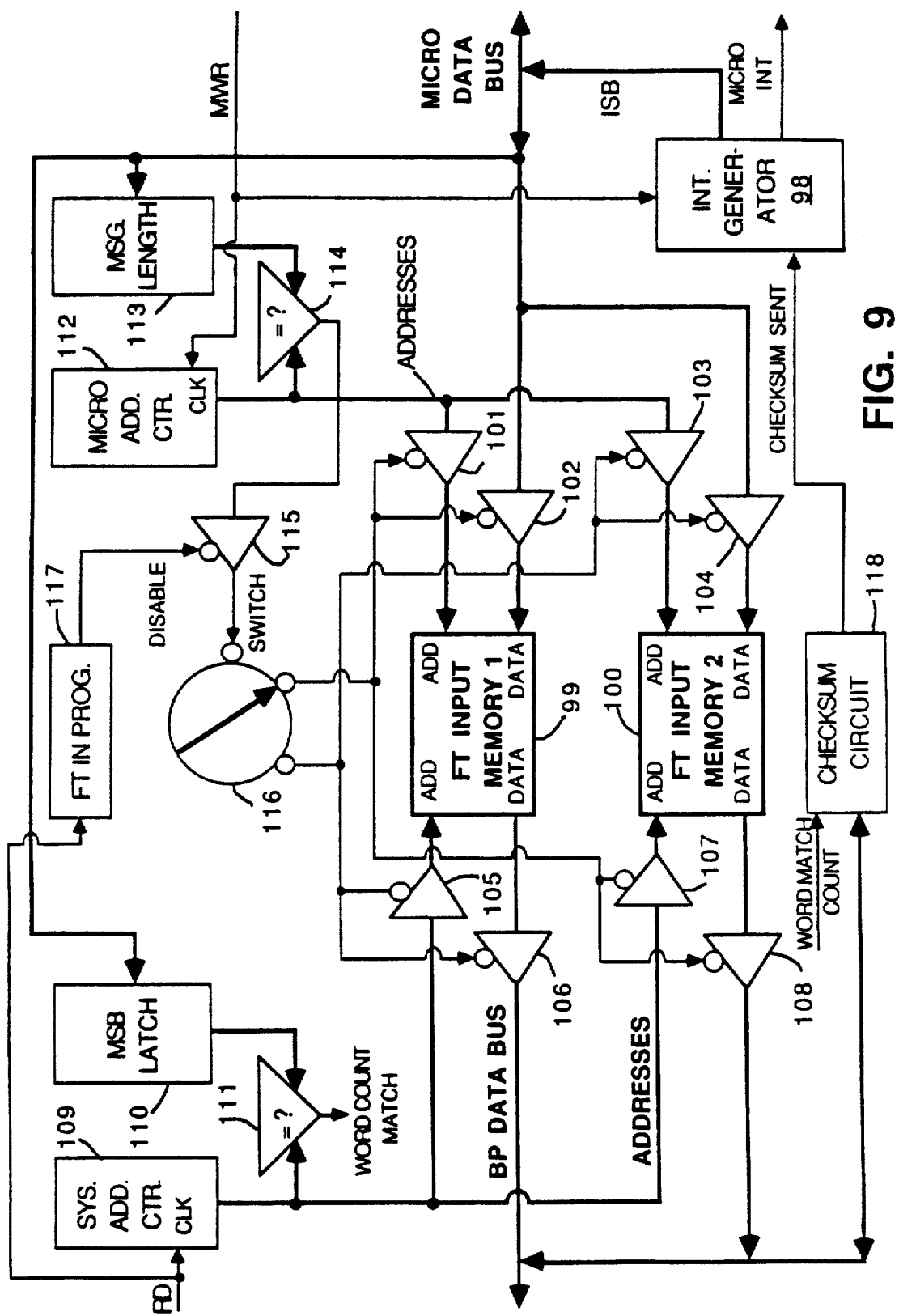
FIG. 9 is a block diagram of a file transfer input circuit seen in FIG. 5.

The backplane interface circuit 33 includes an interrupt generator 98 (shown in FIGS. 8 and 9) which generates an interrupt signal to the microelectronic CPU 31 and which transmits an interrupt status byte (ISB) 43, represented in FIGS. 2, 8 and 9, which identifies the event which caused the interrupt signal. The interrupt status byte is read by the CPU 31 through the MICRO DATA BUS seen in FIGS. 5, 8 and 9. The interrupt status byte is defined in Table 9 below.

TABLE 9

| BIT | INTERRUPT STATUS BYTE DESCRIPTION |
|---|---|
| 0 | Module Control Byte (MCB) Received<br>0 = NO<br>1 = YES |
| 1 | Output File Transfer Received<br>0 = NO<br>1 = YES |
| 2 | I/O Reset Change<br>0 = OFF<br>1 = ON |
| 3 | Single Transfer Output Data Received (2 bytes) (all)<br>0 = NO<br>1 = YES |

TABLE 9-continued

| BIT | INTERRUPT STATUS BYTE DESCRIPTION |
|---|---|
| 4 | Single Transfer Input Data Sent (2 bytes) (all)<br>0 = NO<br>1 = YES |
| 5 | Output File Memory Status<br>0 = No Status to Report<br>1 = Both Write Files Full<br>/One Write File Empty |
| 6 | System Has Read Checksum for Input File<br>0 = NO<br>1 = YES |
| 7 | Input File Memory Status<br>0 = No Status to Report<br>1 = No Message Length Set<br>/One Read File Full |

In the above table, the "1" state is the logic true state. Some of the bits are defined with one "true" condition (bits 0, 1, 2, 6). Other bits such as bits 3 and 4 will be "true" when a number of single bytes have been transferred. The meaning of bits 5 and 7 when "true" (logic 1) is the first alternative shown in Table 9, unless certain bits are set in the programming byte to select the second alternative (after the "/").

During communication in the file transfer mode, the microelectronic CPU 31 sends a module status byte (MSB) to the backplane interface circuit 33 to define the size of the file and direction of transfer for any file to be transmitted through the backplane 18 to the PC system processor 11. This is sent back to the PC system processor, which is followed by transfer of the file of I/O data, and then a checksum comparison. The backplane interface circuit 33 calculates a checksum for any input file that is transmitted back to the PC system processor 11, and it also calculates a checksum for incoming data in any output file that is received from the PC system processor 11.

This has been a description of the general operations of the I/O module and of the real time data and control data which is communicated to and from the backplane interface circuit 33 in carrying out those operations. The next section will describe communication between the backplane interface circuit 33 and the backplane 18.

C. I/O Data Communications through the Backplane

As seen in FIG. 2, an I/O module 25 incorporating the present invention interfaces through the I/O chassis backplane 18 with a backplane controller, which may be either a system processor 11 or adapter module 19 located in the leftmost slot in the I/O chassis 17. With the adapter module 19 installed in the I/O chassis 17, the I/O module 25 communicates upstream through the serial data link with the PC system processor 11.

Figure 4:
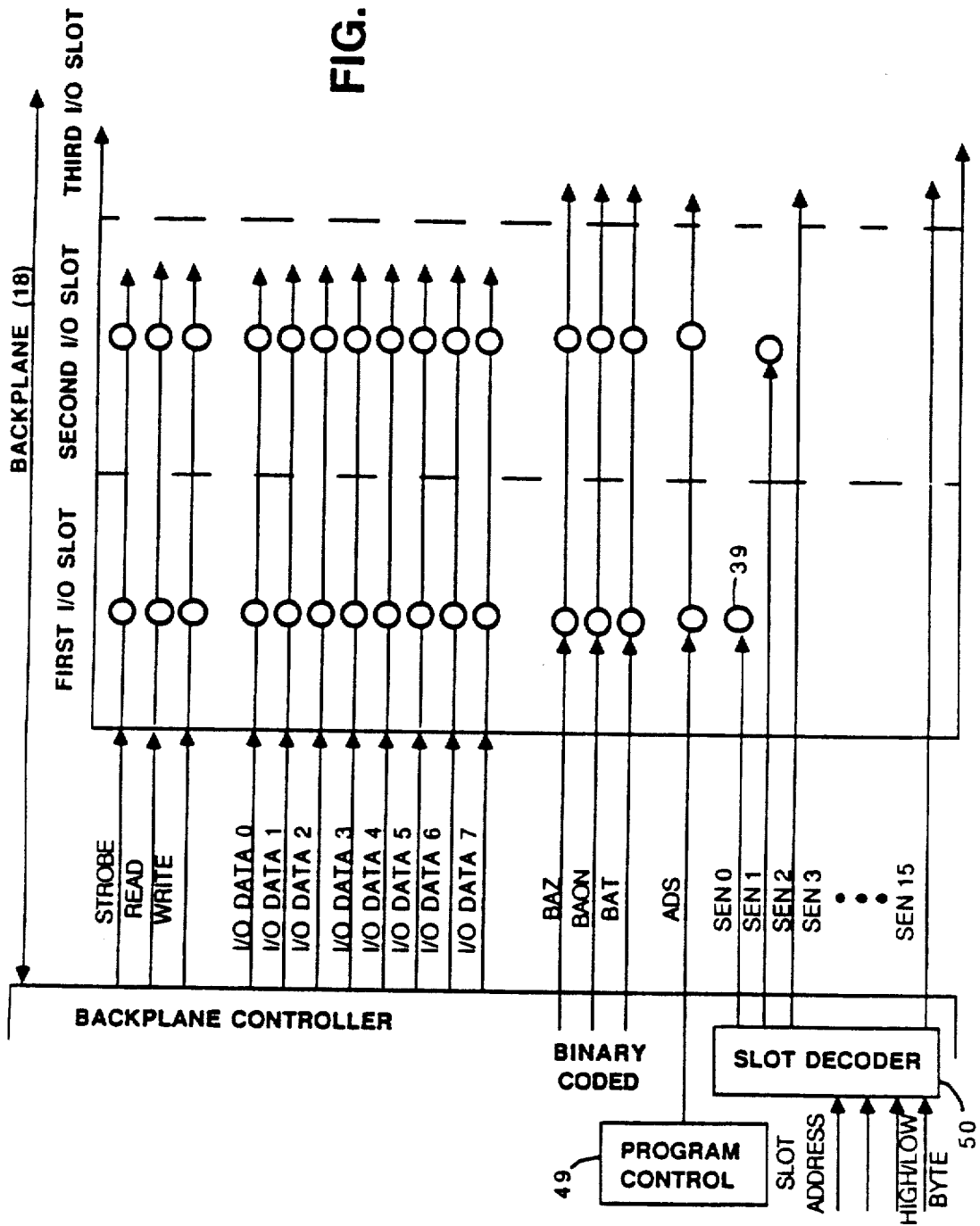
FIG. 4 is a schematic of a portion of the backplane of the equipment chassis seen in FIG. 1.

The backplane 18 is a printed circuit board with ADDRESS, DATA and CONTROL lines as shown more particularly in FIG. 4. For the purposes of the description herein, the adapter module 19 may be considered "transparent" to the operations between the PC system processor 11 and I/O unit 15.

In either a local or remote programmable controller system, the same signals are generated on the backplane 18. The module that generates these signals may be either a PC system processor or an adapter module, and the term "backplane controller" shall be used to mean one of these modules placed in the I/O unit 15.

For example, as shown in FIG. 2, PC system processor 11 includes a microelectronic processor 45 and a memory 46 that stores real time discrete I/O data in an I/O image table 47. The adapter module 19 also includes these elements, so that discrete I/O data can be received, buffered and then transmitted across the backplane just as if the PC system processor 11 were located in the leftmost slot of the I/O unit 15.

File transfer (FT) data, also known as BT data (block transfer file data), is stored in another area 48 of the PC system processor memory 46 that is outside the I/O image table 47 for discrete I/O data, but within a larger I/O data table. The FT data is communicated through a corresponding buffer area of memory in the adapter module 19.

The I/O image table in the PC system processor 11 is memory mapped to system I/O addresses which are assigned to the I/O modules 25 in a user programming language. These addresses correspond one-to-one with locations in the I/O image table 47, and thus the term "image" is part of the name "I/O image table". These I/O addresses are observed as octal numbers displayed in the graphical type of user application program which is typically used. The location of the I/O modules 25 at remote locations and the communication over the serial data link 14 does not change this relationship.

As an example of the user addressing system, it shall be assumed that a byte of data is stored at user location 0101 (octal) in the image table 47. This byte is a byte of output data (the first "0" meaning "output") to be transferred to Rack 1 (the first "1" meaning "rack 1") Module Group 0 (the second "0" meaning module group "0") High Byte (the second "1" meaning "high byte"). Because the image table 47 is considered to have sixteen-bit words, each module group contains a high byte and a low byte in the image table. The high byte/low byte address is converted by the controller to an address signal during the I/O scan, so that each byte is associated with a unique system I/O address. Module Group "0" is considered to include two eight-bit capacity I/O modules placed side-by-side in two physical slots with one receiving the high byte and the other receiving the low byte from the sixteen-bit location in the image table.

As seen in FIG. 4, the backplane 18 allows a memory area of (8 words × 16 bits) to be mapped to sixteen slots for 8-bit modules. The high byte/low byte signal is the low order bit in a four-bit binary address which is decoded by a slot decoder 50 to activate one of sixteen slot enable lines (SEN 0-SEN 15) (octal) on the backplane 18. One of these slot enable lines runs to a back edge termination area 39 in each slot which connects to a corresponding terminal on an I/O module placed in the slot.

In a multi-rack system, the user I/O address would also include an octal rack address. This number would also be decoded to select or address one of seven I/O rack units and to enable the slot address to be communicated to the backplane 18.

The slot enable lines have previously been used on the backplane—so also have the eight lines of the data bus (DATA 0-DATA 7), the READ line, the WRITE line and the STROBE line. Other previously known lines are also present on the backplane, but these have not been shown as not being essential to the understanding of the present invention.

Prior to the invention there has not been an I/O module which could execute both file transfers as described in Struger et al., U.S. Pat. No. 4,293,924 and an I/O scan of discrete I/O data. Signals generated during an discrete I/O scan and signals generated for the file transfer method of the Struger '924 patent had not been directed to the same physical I/O module in the same I/O slot. The module control byte (MCB) used in the file transfer method of the Struger '924 patent had to be separately identifiable from the real time I/O data transferred during the discrete I/O scan.

In the Struger '924 patent the module control byte (MCB) is stored in the I/O image table in the location that would otherwise be occupied by a byte of discrete output data.

During the I/O scan, bytes of discrete I/O data are exchanged rapidly with all of the slots in the I/O unit. When the MCB is sent to the I/O chassis slot where a file transfer module is located, the byte is interpreted as control information rather than as discrete I/O data because there is no discrete I/O module in the slot to recognize discrete I/O data.

In the present invention, however, the I/O module 25 in the I/O slot recognizes both discrete I/O data and MCB's for initiating file transfers, and is capable of transferring both discrete I/O data and file transfer I/O data.

The backplane interface circuit 33 also solves the problem of making the I/O module compatible with two types of backplane controllers.

First, for earlier system processors and adapters (backplane controllers), the circuit 33 provides for multiple-byte transfers of discrete I/O data to the same I/O module during an I/O scan by interpreting signals on byte address lines BAZ, BAON and BAT first disclosed in Struger et al., U.S. Pat. No. 4,691,296, and in addition, the circuit 33 provides for file transfers according to the file transfer method of Struger et al., U.S. Pat. No. 4,293,924 (the Struger '924 patent). This allows the I/O module 25 to remain compatible with existing system processors and adapter modules which utilize the BAZ, BAON and BAT lines and which do not include an ADS line included in newly developed system processors and adapters.

Second, for newly developed system processors and adapters (backplane controllers), the circuit 33 interprets signals on the ADS line and executes both file transfers and single byte transfers.

For earlier system processors and adapters, the lines BAZ (byte address 0), BAON (byte address 1) and BAT (byte address 2) have been included on the chassis backplane 18 to handle addressing of eight system I/O addresses on a single I/O module. These lines run across the full backplane and connect to each I/O module. These lines carry a three-bit byte address ranging from "000" to "111".

The byte address on lines BAZ, BAON and BAT is decoded on the I/O module 25 which is enabled by a slot enable signal on lines SEN 0-SEN 15. The three-bit byte address can be transmitted in conjunction with any one of the sixteen slot enable signals (SEN 0-SEN 15) so that (16 × 8) bytes can be transmitted to one I/O unit, an eightfold increase over I/O units without the byte address lines.

In the present invention, the BAZ line (the low order line) is utilized to provide two single byte addresses "0" and "1" at a particular slot address. The lowest single byte address ("0") is used for file transfer as shall be explained in more detail below. The other single byte address ("1") is used for transfer of a single byte of discrete input data and a single byte of discrete output data. During the discrete I/O scan, each single byte location is addressed twice, once during the input scan and once during an output scan.

The ADS line has been added to the backplane 18 to accommodate newer system processors and adapter modules. Signals on this line are recognized by the backplane interface circuit 33 to distinguish between single byte transfers and file transfers to the same system I/O address. Element 49 represents the detection of the file transfer function during execution of a PC-system level file transfer programming instruction of a type known in the art. This instruction includes a system I/O slot address which is the same system I/O slot address where discrete I/O data is communicated. The machine-level instructions in the PC system processor have been modified, so that when the file transfer programming instruction 49 is executed, the "file transfer" function is detected and a logic true signal is transmitted on the ADS line to signal a file transfer.

The single transfer (I/O SCAN) mode is carried out in response to machine-level instructions in the PC system processor, which are executed after each cycle of execution of the ladder diagram program. When the machine-level instructions are executed for the I/O SCAN mode, a logic false signal is transmitted on the ADS line to signal single byte transfer. This allows single transfer and file transfer to the same system I/O address.

D. The Backplane Interface Circuit

FIG. 5 shows the the primary operating circuits of the backplane interface circuit 33. Suitable additional buffer circuitry is added to convey the signals shown in FIG. 5 on and off the particular chip utilized as the backplane interface circuit 33, but this has not been illustrated as it does not change the function of the signals or circuitry shown in FIG. 5.

The backplane interface circuit 33 for the I/O module 25 includes a backplane control logic circuit 51 which connects to slot enable (SEN) read (RD), write (WR), strobe (STRB), module present (MOD PRES) and module ID (MOD ID) lines on the backplane 18 to receive and send these signals according to their direction of communication.

The RD, WR and STRB lines are coupled through circuit 51 to RD/WR CONTROL lines for controlling the input and output of data to various other subcircuits within the backplane interface circuit 33 such as the single transfer output circuit 53, the single transfer input circuit 54, the file transfer output circuit 55 and the file transfer input circuit 56. Signals on the SEN, RD, WR and STRB lines generate the MOD PRES signal back through the backplane 16 to signify the presence of an I/O module in the slot of the I/O chassis 17.

To activate the backplane control logic circuit 51, the I/O module 25 is addressed through the backplane, and a logic true signal is transmitted on the SEN line for the appropriate slot in which the I/O module is located. The SEN signal also activates a backplane decoding circuit 51a, which is included within the backplane logic circuit 51.

To determine the modes of communication (I/O scan mode, FT Mode 1, FT Mode 2), the backplane interface circuit 33 receives the programming byte discussed earlier in relation to Table 7. This byte is loaded into a programming byte latch 58 in micro decoding circuit 60. The outputs of this latch 58 generate TRANSFER MODE SELECT signals to the backplane decoding circuit 51a to select the mode of file transfer communication, FT Mode 1 or FT Mode 2 and, where FT Mode 1 is selected, the number of bytes of single transfer data (2, 4 or 8) to be communicated in each direction.

The backplane data bus (BP DATA BUS) includes eight lines (D0-D7) which connect to the circuits 53-57 for transfer of bytes of data in either the single transfer mode or one of the file transfer modes.

Assuming the circuit 33 had been programmed for operation in FT Mode 1, the backplane decoding circuit 51 recognizes a byte address of "000" on lines BAT, BAON and BAZ lines as being an address to an I/O location for a file transfer. This address is decoded by a 3-to-8 line decoder (not shown) to generate an FT ENABLE signal to the circuit 52, which in turn enables read/write and other sequencing signals to control the file transfer circuitry 55, 56 through CTRL lines seen in FIG. 5. In addition, bits "6" or "7" must be set in the module control byte (MCB) which is received as data through the BP DATA BUS. These bits are detected by the MCB/MSB control circuit 52 in FIG. 5. This circuit 52 generates a signal to the interrupt generator circuit 98 in FIGS. 8 and 9, which in turn generates an MCB RECEIVED interrupt to the CPU 31 to start the file transfer sequence. The MCB/MSB control circuit 52 also generates a "DO BT" signal to the backplane control logic circuit 51 to generate the MOD ID signal back to the backplane controller.

As a consequence of expecting file transfers in the FT Mode 1, the backplane decoding circuit 51 will not recognize signals on the ADS (advanced diagnostics) line. This makes the backplane interface circuit 33 compatible with existing processors and adapter modules which do not provide an ADS output signal or an ADS terminal on the backplane 18.

When operating in the single transfer mode or I/O SCAN mode, the backplane decoding circuit 51 sequences the transfer of multiple bytes to a plurality of registers in the single transfer output circuit 53 or from a plurality of registers in the single transfer input circuit 54 by generating BYTE ENABLE signals in response to decoding of the binary coded byte addresses received on the byte address lines BAT, BAON and BAZ.

Assuming the circuit 33 had been programmed for operation in FT Mode 2, the following sequence would occur to initiate a file transfer. When the file transfer programming instruction was executed for a particular system I/O address, the file transfer function is recognized and a logic low true signal is generated on the ADS line. The decoding logic circuit 51 responds to the ADS signal, as it did to the "000" byte address in FT Mode 1, to generate an FT ENABLE signal to the circuit 52. The MCB/MSB & BT SEQ. CTRL. circuit 52 in turn enables read/write and other sequencing signals to control the file transfer circuitry 55, 56. As in FT Mode 1, the module control byte (MCB) must be detected with either bit 7 or bit 6 set to a logic high true or logic "1" state, to generate the "DO BT" signal and the MOD ID signal. With the ADS line at a logic low, the byte address lines BAT, BAON, BAZ become inactive or are not recognized, so that single byte transfers will not take place until the file transfer is completed. Single byte transfers are executed with the ADS line in a logic high state.

When single byte transfers are to be executed during the I/O scan of discrete I/O data, and the circuit 33 has been set to operate in FT Mode 2, the backplane controller generates a logic high (false) signal on the ADS line and the byte address lines BAT, BAON, BAZ become active to address and enable registers for single byte transfers. The registers in the single byte transfer circuitry 53, 54 are enabled through the BYTE ENABLE lines by signals from the backplane decoding circuit 51a in response to the address signals on lines BAT, BAON and BAZ.

Figure 10:
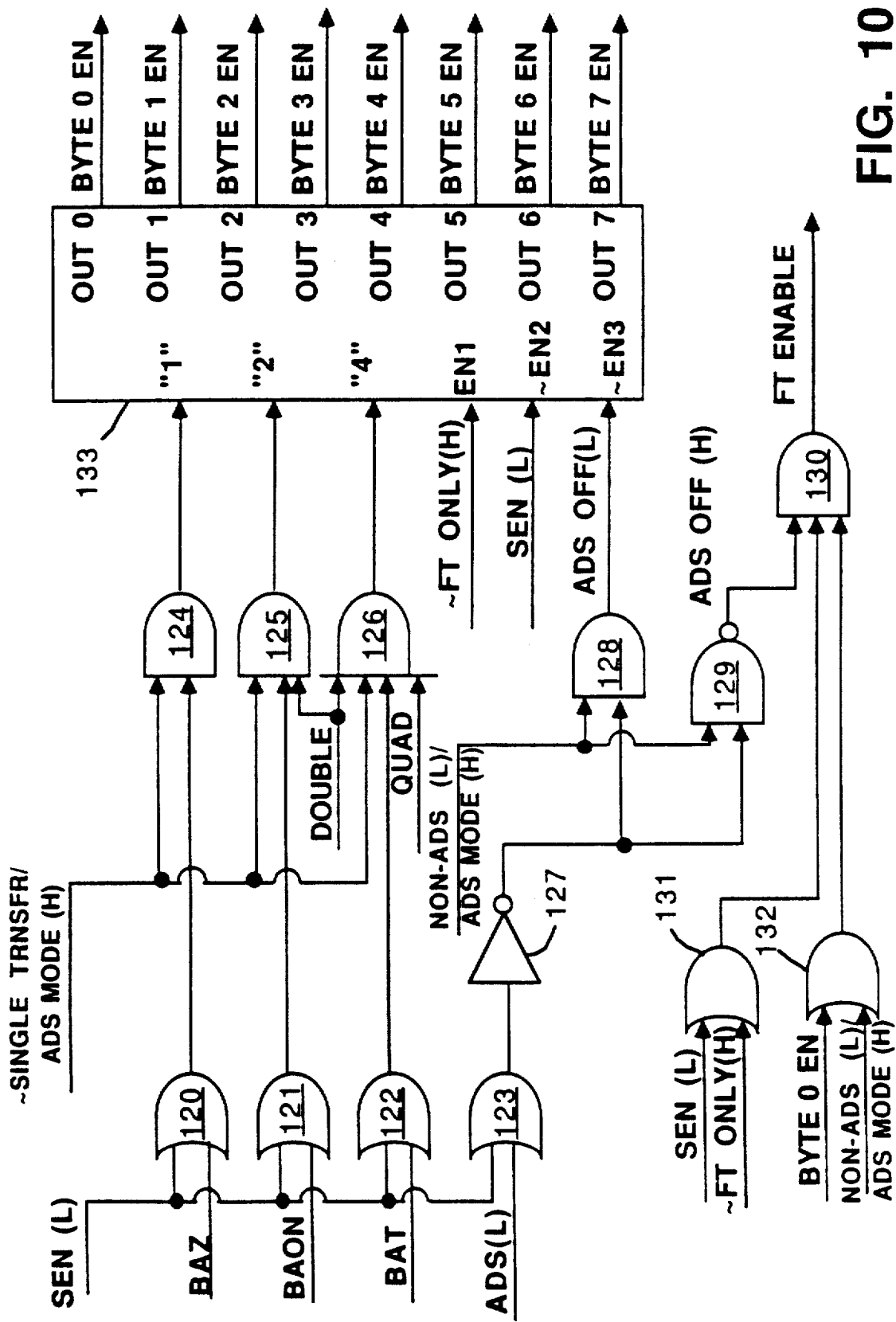
FIG. 10 is a schematic diagram of a backplane decoding circuit seen in FIG. 5.

The details of the backplane decoding circuit 51a are shown in FIG. 10. The ADS, BAT, BAON and BAZ lines are connected to one input of four respective OR gates 120-123. The other input of each of these OR gates 120-123 is connected to the slot enable (SEN) line. When the slot enable signal is active, the signal at the input of the OR gates is low true. This allows the signal at the other input to control the output. When the signal on ADS line is low true to the input of OR gate 123, the output will be low true. When a low signal is on the BAT, BAON and BAZ lines, a logic "0" is signalled through gates 120-122, and when a high signal is on the BAT, BAON and BAZ lines, a logic "1" is signalled through gates 120-122.

The outputs of gates 120-122 are connected to one input of respective AND gates 124-126. These gates 124-126 also receive the TRANSFER MODE SELECT signals from the micro decoding circuit 60 in FIG. 5. One of these mode select signals is "DOUBLE", which means that two bytes of data will be transferred in the single transfer mode. When this mode is selected, a logic low signal on the DOUBLE line in FIG. 10 disables gates 125 and 126. Then the signal on the BAZ line is transmitted to a "1" input on a 3-to-8 line decoder 133, but the signals on the BAT and BAON lines are not transmitted to the other inputs on the decoder 133. With the "1" input being the sole active input, and the only active outputs on the decoder 133 are OUT 0 and OUT 1. When the QUAD mode is selected, a logic low signal on the QUAD line disables gate 126, so that only the signals on the BAZ and BAON lines are transmitted to the "1" and "2" inputs on the decoder 133. This enables four bytes of data to be transferred in the "QUAD" mode using outputs OUT 0-OUT 3 on the decoder 133. The −SINGLE TRANSFER/ADS mode select line is usually high to enable gates 124-126. When this mode is selected, the line goes low to disable the gates 124-126 and the only output on the decoder 133 which is active is the OUT 0 output.

The decoder 133 has the logic configuration of a Model "138" decoder popularized in TTL logic packages by Texas Instruments and other manufacturers. This circuit includes three enable inputs, EN1, EN2 and EN3. If the ENa input goes low or the EN2 or EN3 input receives a logic high signal, the outputs of the decoder 133 are disabled. For example, the signal to the EN1 input is a mode for file transfer only in a non-ADS system. If this mode is selected by generating a logic low signal to the EN1 input, the decoder 133 is disabled. Usually, a logic high signal is present indicating this mode has not been selected. During operation of the decoder 133, the SEN signal must be present at a logic low level to enable EN2. In an ADS system, during file transfers when the ADS line is active, the decoder 133 is disabled. This is implemented by connecting the ADS line through inverter 127 to one input of an AND gate 128, and by coupling ADS mode select line (high select) to the other input on the AND gate 128. If either input is low, the ADS mode is off and the decoder 133 remains enabled at EN3.

The FT ENABLE line is controlled by the output of AND gate 130 in response to conditions at three inputs. As long as one of the three conditions is absent the FT ENABLE line is active (low true). First, the ADS OFF signal is converted to a high true ADS OFF signal by connecting the ADS line and ADS mode select line to the inputs on a two-input NAND gate 129. Second, the SEN signal enables OR gate 131 so that the FT ONLY (logic high select) signal is coupled through to enable gate 130. And third, the NON-ADS/ADS MODE SELECT line and the BYTE 0 EN line are coupled through OR gate 132 to the third input of gate 130. As long as the backplane interface circuit 33 is operating in the ADS Mode, or in the FT ONLY Mode, or if the BYTE 0 ENABLE signal is active in a NON-ADS MODE, the FT ENABLE line is active. If all of these conditions are absent the FT ENABLE line goes high and becomes inactive.

To read MIDD Byte 0 from the MIDD byte input circuit 57, the backplane decoding circuit 51 decodes active signals on the SEN and ADS lines and inactive signals on the RD and WR lines to generate an ID READ enable signal to the MIDD byte input circuit 57. In this way the ADS line functions as a pseudo read line to permit reading of data outside the normal memory-mapped area of the I/O SCAN mode.

The microelectronic CPU 31 also accesses the subcircuits 53-57 to transfer data to and from the backplane interface circuit 33. When the microelectronic CPU 31 communicates with the backplane interface circuit 33, it generates a chip enable (MCE) signal to a micro decoding circuit 60 and to a set of bidirectional data buffers 61 connecting to the MICRO DATA BUS.

The microelectronic CPU 31 also generates read and write control signals on the MRD input and MWR input on the backplane interface circuit 33. These inputs are connected to a micro decoding subcircuit 60, which also receives address signals MA0-MA4 from the microelectronic CPU 31. The read/write and address signals are decoded to address individual registers in the single transfer circuits 53 and 54 through the BYTE SELECT lines. The read/write and address signals are also decoded to address the file transfer circuits 55 and 56 through the FILE TRANSFER ENABLE lines.

A memory map for addressing through lines MA0-MA4 in conjunction with signals on the MRD and MWR lines is given in Table 10 below.

TABLE 10

| ADDRESS (HEX) | MICROPROCESSOR ADDRESS MAP | | |
|---|---|---|---|
| | MRD(L) | MWR(L) | DATA ACCESSED |
| XX00 | L | H | READ BYTE 0 |
| XX00 | H | L | WRITE BYTE 0 |
| -TO- | | | -TO- |
| XX07 | L | H | READ BYTE 7 |
| XX07 | H | L | WRITE BYTE 7 |
| XX08 | L | H | READ MCB |
| XX09 | H | L | WRITE MESSAGE LENGTH & RESET ADDRS. CTR. |
| XX0A | L | H | READ OUTPUT FILE |
| XX0A | H | L | WRITE INPUT FILE |
| XX0B | H | L | WRITE INPUT FILE MSB |
| XX0C | H | L | WRITE OUTPUT FILE MSB |
| XX0D | L | H | READ ISB |
| XX0E | H | L | WRITE PROGRAM BYTE |
| XX0F | H | L | WRITE TO "KICK" WDOG |

TABLE 10-continued

MICROPROCESSOR ADDRESS MAP

| ADDRESS (HEX) | MRD(L) | MWR(L) | DATA ACCESSED |
|---|---|---|---|
| XX10 | H | L | WRITE MIDD BYTE 0 |

In the above table, registers in the single byte transfer circuitry 53, 54 for BYTE 0 through BYTE 7 are addressed at the first eight addresses. Locations in the file transfer circuitry 55, 56 for the READ MCB, MESSAGE LENGTH, ADDRESS COUNTER, OUTPUT FILES and INPUT FILES are addressed at the next six addresses. Latching circuitry for the ISB, PROGRAM BYTE, "KICK" WDOG and MIDD BYTE 0 are addressed at the last four addresses in Table 10.

The backplane interface circuit 33 also receives an 8-Mhz master clock (MCLK IN) signal from a clock circuit (not shown) on the I/O module 25 which generates clock signals for the microelectronic CPU 31. The MCLK IN signal drives a watchdog timer circuit 59, which must be enabled through a master reset (MRESET) line and "kicked" or retriggered once each 64 milliseconds by writing a specified byte through the data bus (MICRO DATA BUS). If the watchdog timer "times out" before being retriggered, a major communication fault is declared for communication between the microelectronic CPU 31 and the backplane interface circuit 33 and a signal is returned on the watchdog timeout (TIMEOUT) line to the microelectronic CPU 31. The watchdog timeout is signalled to the backplane controller in the "0" bit of MIDD Byte 0.

Figure 6:
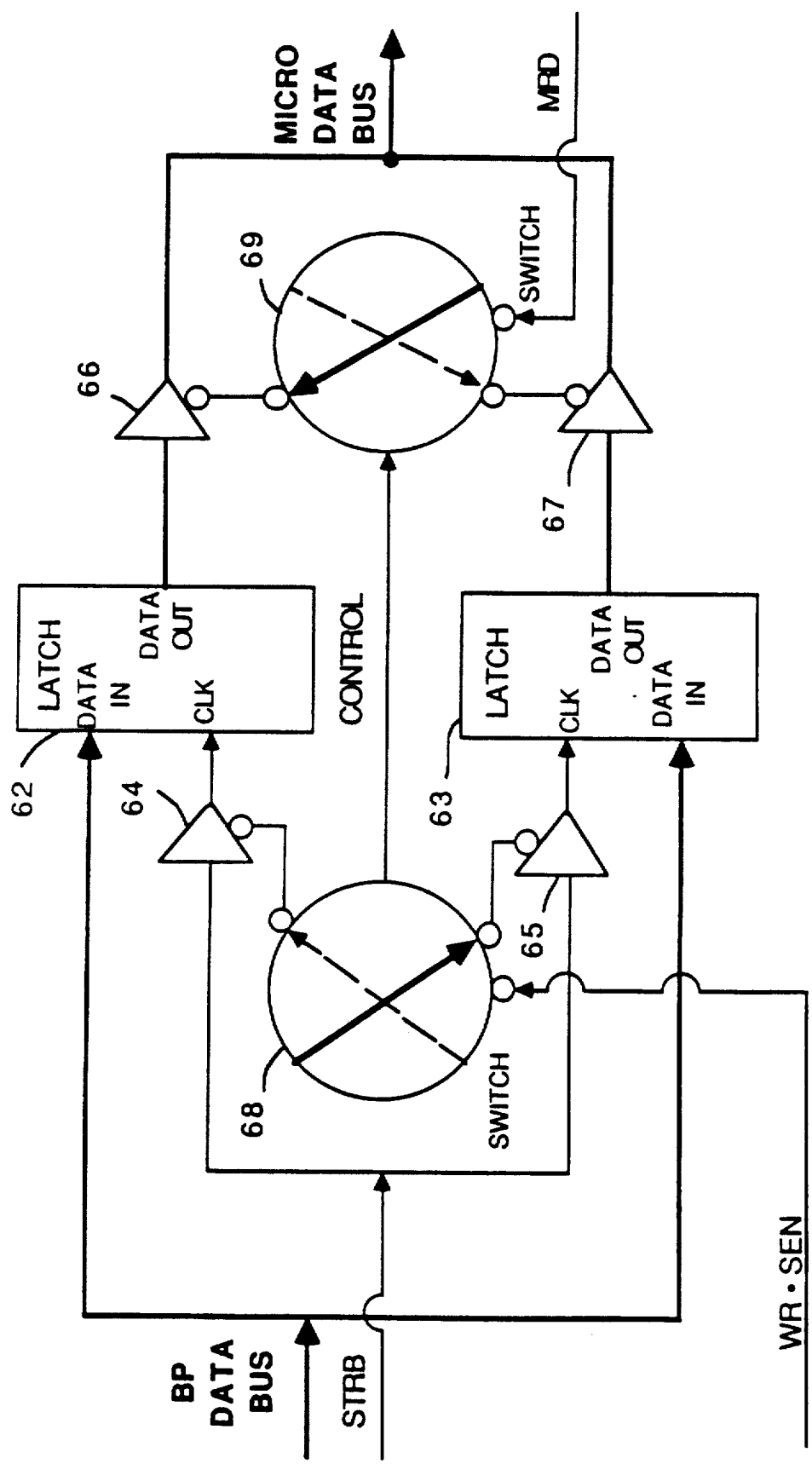
FIG. 6 is a block diagram of a single transfer output circuit seen in FIG. 5.
Figure 7:
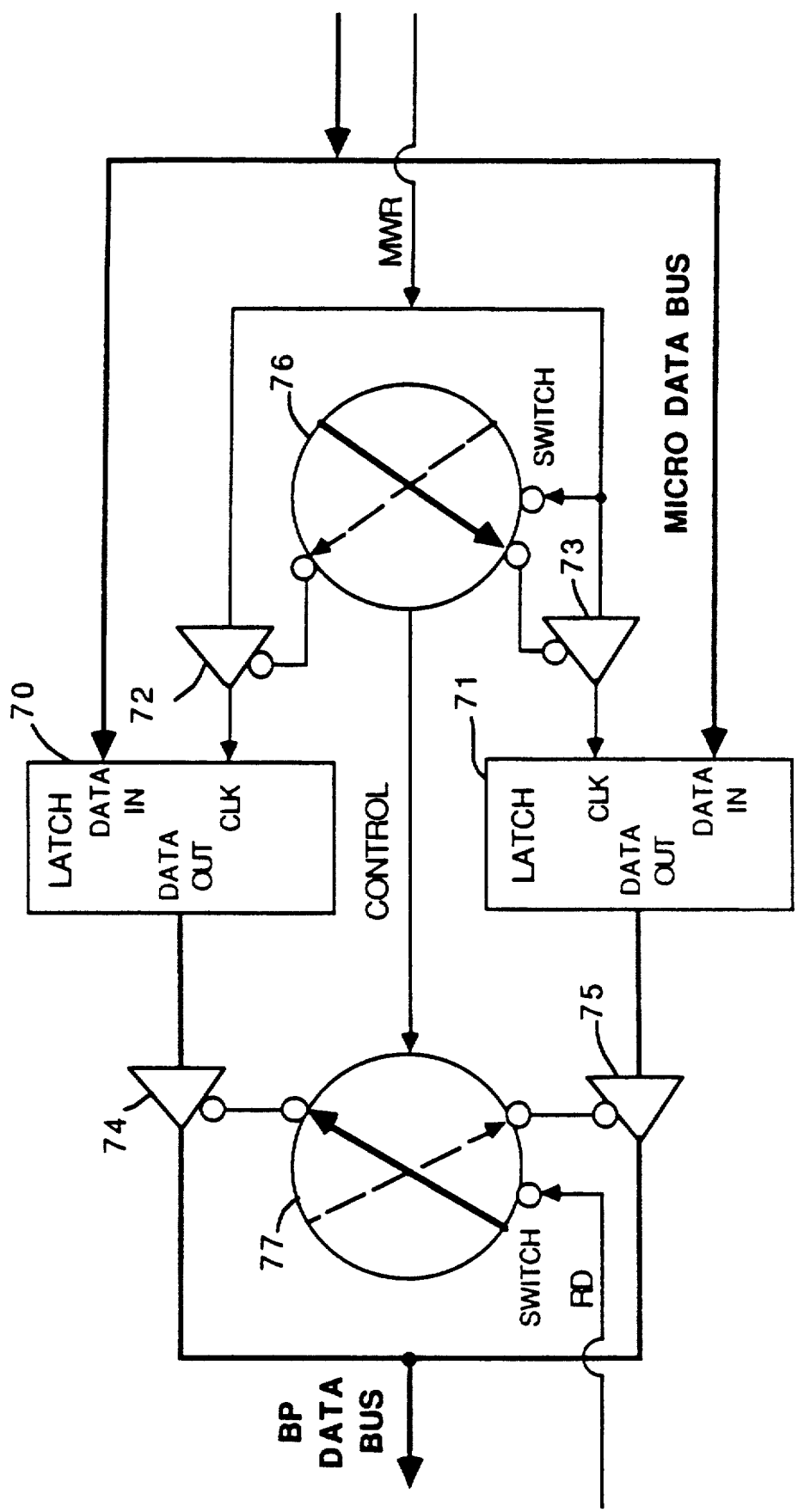
FIG. 7 is a block diagram of a single transfer input circuit seen in FIG. 5.

Referring to FIGS. 6 and 7, the details and operation of the single transfer circuits will now be described. The single transfer output circuit 53 of FIG. 5 includes eight circuits as shown in FIG. 6 which are connected in parallel, so the circuit in FIG. 6 would be provided to handle one byte of single transfer data such as SINGLE BYTE 0.

Each single transfer circuit is double buffered and has two latches 62, 63 to handle each byte, so that while the system processor 11 is transferring BYTE 0 to one latch 63, the microelectronic CPU 31 can be accessing a previous communication of BYTE 0 from another latch 62.

The backplane data bus (BP DATA BUS) seen earlier in FIG. 5 connects to data inputs (DATA IN) on the two latches 62 and 63. The strobe (STRB) signal from the backplane 18 is communicated through two buffer gates 64 and 65 to the clock (CLK) inputs on the two latches 62, 63.

An enabling signal is transmitted to a SWITCH input on the backplane pointer circuit 68 in response to the logical product (WR.SEN) of signals on the WR line and the SEN line. The backplane pointer circuit 68 enables one or the other of the two gates 64 and 65 to complete a data path to one of the two latches 62, 63. The backplane pointer circuit 68 will always point to the latch with the least current data, and in this case it shall be assumed to be the second latch 63.

The backplane pointer circuit 68 also generates a CONTROL signal to a micro pointer subcircuit 69 to enable the one of two buffer gates 66, 67, that controls the reading of data from the data outputs (DATA OUT) on the opposite latch 62, so that the microelectronic CPU 31 can read data from latch 62, which has the most current data. When data has been written to latch 63, the active signals on the WR and SEN lines cause a "switch" to occur at the end of the write cycle and the new pointing state is latched by MRD signals from the microelectronic CPU 31 to read data from the latch which has the most current data. During the next write cycle, when the logical product of signals on the SEN and WR lines is again true, the gate 64 for the first latch 62 will be enabled through circuit 68 and this will lock the micro pointer circuit 69 in its position for reading the second latch 63.

Referring to FIG. 7, the single transfer input circuit 54 in FIG. 5 also includes eight double buffered circuits connected in parallel, with one of these being shown in FIG. 7 to handle one byte of single transfer input data such as SINGLE BYTE 0. Each byte of single transfer data is transferred in relation to two latches 70, 71. The MICRO DATA BUS seen earlier in FIG. 5 connects to data inputs (DATA IN) on the two latches 70 and 71. The micro write (MWR) signal is communicated through two buffer gates 72 and 73 to the clock (CLK) inputs on the two latches 70, 71. A micro pointer subcircuit 76 enables one or the other of the two gates 72 and 73 to point to one of the two latches 70, 71.

The pointer subcircuit 76 also generates a CONTROL signal to the backplane read pointer subcircuit 77 in response to the micro write (MWR) signals during transfer to the second input latch 71, so that subcircuit 77 remains pointing to the first input latch 70 by enabling gate 74. When data has been written to latch 70, the active signals on the MWR line cause a "switch" to occur at the end of the write cycle and the new pointing state is latched by RD signals from the backplane 18 to read data from the latch which has the most current data. Data is read from the data outputs (DATA OUT) on the appropriate latch 70, 71. During the next write cycle from the microelectronic CPU 31, signals on the MWR line will cause the the pointer circuit 77 to enable gate 72 so that data can be transferred into the first input latch 70. During this time the control signal from pointer circuit 76 will lock the backplane pointer circuit 77 in its position for reading the second latch 71.

Before discussing the details of FIGS. 8 and 9, it is helpful to review the sequence for transfer of data in FT Mode 1. First the system processor 11 through the adapter module 19 writes a module control byte (MCB) to the backplane interface circuit 33. The module control byte is defined as follows:

| Bit 7 | Bit 6 | Bit 5 | Bit 4 | Bit 3 | Bit 2 | Bit 1 | Bit 0 |

| R | W | Nr. 2-byte words in file (6 bits) | where "R" is a read flag bit and "W" is a write flag bit denoting the direction of transfer relative to the PC system processor.

Next, the backplane interface circuit 33 returns a module status byte (MSB) (provided by CPU 31) of the same format to confirm the direction of transfer and size of the file to be transferred.

Then the file data is sent and this may be up to 64 words (128 bytes). After the file data is transferred a checksum is transferred and compared to a checksum calculated at the receiving circuitry to assure there has not been an error in transmission.

Now referring to FIG. 8, the file transfer output circuit 55 more particularly includes a first FT output memory 78 and a second FT output memory 79. These both have DATA inputs which connect in parallel on one side to the BP DATA BUS and DATA outputs which connect on the other side to the MICRO DATA BUS. Access to the memories 78, 79 from the BP DATA BUS is controlled through buffers 81 and 83. The reading of data through the MICRO DATA BUS is controlled through buffers 85 and 87.

On the backplane side, the first FT output memory 78 is addressed from a system address counter 88 which is incremented by signals at its CLK input in response to write signals on the WR line. The address outputs on the counter 88 are connected to address (ADD) inputs on the first FT output memory 78 through buffers 80 and to address (ADD) inputs on the second FT output memory 79 through buffers 82.

On the side communicating with the CPU 31 (the micro side), the first FT output memory 78 is addressed by a micro address counter 91, which is incremented by logic signals at its CLK input in response to read signals on the MRD line. The address outputs on the counter 91 are connected to address (ADD) inputs on the first FT output memory 78 through buffers 84 and to address (ADD) inputs on the second FT memory 79 through buffers 86.

The selection of either the first or second FT output memory 78, 79 for transferring data and which buffer gates are enabled are functions controlled by a pointer circuit 96. When this circuit 96 is enabling buffers 82, 83, 84 and 85, as seen in FIG. 8, data can be transferred into FT output memory 79 from the backplane and data can be read from FT output memory 78 by the microelectronic CPU 31. When this circuit 96 is switched to enable buffers 80, 81, 86 and 87, data can be transferred into FT output memory 78 from the backplane and data can be read from FT output memory 79 by the microelectronic CPU 31.

When a module control byte (MCB) is transferred to the circuit 52 in FIG. 5 and identified as such, an interrupt is generated to the microelectronic CPU 31 through the interrupt generator circuit 98 in FIG. 8. The CPU 31 then has sixty-eight microseconds to return a module status byte (MSB) to a latch in the circuit 52 if the file transfer is to be executed.

In addition to sending the module status byte (MSB) to the circuit 52, the module status byte (MSB) is also loaded into either the MSB 1 latch 84 or the MSB 2 latch 92. On startup, the first FT output memory 78 is selected and the module status byte (MSB) is loaded into the MSB 1 latch 84. The system address counter 88 is then incremented on every word (every second byte) up to the word size of the file defined by the MSB. The output of the counter 88 is compared by comparator circuit 90 to the number of words defined by the MSB stored in latch 84. When a match occurs, a WORD COUNT MATCH signal is generated to activate a checksum circuit 97.

As each byte of data is transferred into one of the memories 78 and 79, it is also transferred through the BP DATA BUS to the checksum circuit 97, where it is added to a running checksum. When the WORD COUNT MATCH signal is received by the checksum circuit 97, the next data received through the backplane is interpreted as the transmitted checksum. The checksum circuit 97 then compares the received checksum with the calculated checksum. If a checksum match occurs, a CHECKSUM VALID signal is transmitted from the checksum comparator circuit 97 to the interrupt generator circuit 98, which then generates a VALID MESSAGE RECEIVED interrupt to the microelectronic CPU 31. The checksum calculated by the checksum circuit 97 is also made available to be read through the backplane 18. The CHECKSUM VALID signal is also transmitted to AND logic circuit 95. If this file is the first output file received, as signalled from a "first message" logic circuit 94a to OR logic circuit 94, the pointer circuit 96 is switched to point to the second FT memory circuit 79 to receive the next file.

If a second module control byte (MCB) is written to the backplane interface circuit 33 before the microelectronic CPU 31 has read the first output file, a second module status byte (MSB) can be loaded into the MSB 2 latch 94. This latch 92 is multiplexed with the MS.B 1 latch 84 to connect to the comparator circuit 90. A second output file can be transferred to the second FT memory circuit 79, with the comparator circuit 90 comparing the word count in the counter 88 to the word count in the MSB 2 latch 94. The second output file is received, its checksum is verified, and its presence is made known to the CPU 31 through generation of a second interrupt signal by the interrupt generator circuit 98.

The microelectronic CPU 31 is initially connected to the second FT memory circuit 79 until the first VALID MESSAGE RECEIVED interrupt is generated. The microelectronic CPU 31 then points to the first FT memory circuit 78 and remains in this condition until the output file is read. After the output file has been read, the microelectronic CPU 31 will be switched to connect to the second FT memory circuit 79 on the next VALID MESSAGE RECEIVED interrupt.

If a third module control byte (MCB) is received from the backplane while both memory circuits are full, an FT MEMORIES FULL interrupt is generated from circuit 98 and the module status byte (MSB) stored in circuit 52 is forced to all zeroes as a signal to withhold the next file transfer.

When reading an output file from one of the memories 78, 79, the microelectronic CPU 31 counts the number of words received and compares it to the expected number of words based on the module status byte (MSB). The CPU 31 also increments the micro address counter 91 by generating signals on the MRD line each time a byte is read. For every two MRD signals the address counter 91 is incremented once until the number of counted words equals the file size loaded into the MSB-1 latch 84 or MSB 2 latch 92. The MSB 1 latch 84 and the MSB 2 latch are also multiplexed to the address counter 91, so that the CPU 31 can unload both memories 78, 79. When the word count in counter 91 matches the word count in one of the latches 84, 92, the comparator circuit 93 generates a WORD COUNT MATCH signal to the OR logic circuit 94 to switch the connection of the microelectronic CPU 31 to the other FT memory circuit. The WORD COUNT MATCH signal is also transmitted to the interrupt generator circuit 98 to generate an FT MEMORY EMPTIED interrupt to the CPU 31.

Referring to FIG. 9, the file transfer input circuit 56 more particularly includes a first FT input memory 99 and a second FT input memory 100. These have data (DATA) outputs connected in parallel on one side to the BP DATA BUS and data (DATA) inputs connected in parallel on the other side to the MICRO DATA BUS. Data is read on the BP DATA BUS from the memories 99, 100 when buffers 106 and 108, respectively, are activated. Data is transmitted to memories 99, 100 through the MICRO DATA BUS when buffers 102 and 104, respectively, are activated.

On the backplane side, the first FT input memory 99 is addressed from a system address counter 109 which is incremented in response to signals generated by the backplane controller on the RD line. The address outputs on the counter 109 are connected through buffers 105 to address (ADD) inputs on the first FT input memory 99 and through buffers 107 to address (ADD) inputs on the second FT input memory 100.

On the side communicating with the CPU 31 (the micro side), the first FT input memory 99 is addressed by a micro address counter 112, which is incremented in response to write signals on the MWR line. The address outputs on the counter 112 are connected to the first FT input memory 99 through buffers 101 and to the second FT input memory 100 through buffers 103.

The selection of either the first or second FT input memory 99, 100 for transferring data, and the direction of data transfer, are controlled by a pointer circuit 116. When this circuit 116 is enabling buffers 101, 102, 107 and 108, as seen in FIG. 9, data can be transferred into FT input memory 99 from the CPU 31 and data can be read from FT input memory 100 through the backplane 18. When this circuit 116 is switched to enable buffers 103, 104, 105 and 106, file data can be transferred into the second FT output memory 100 from the microelectronic CPU 31 and file data can be read from first FT input memory 99 through the backplane.

When the CPU 31 is to transfer a file to one of the FT input memories 99, 100, it loads the file length into a message length latch 113. If all the files are to be the same size the message length need only be written once. If the CPU 31 attempts a file transfer without this step, a NO MESSAGE LENGTH SET interrupt will be generated to the CPU 31 through the interrupt generator circuit 98. When the CPU 31 transfers bytes of file data to one of the memories 99, 100, it generates write signals on the MWR line to increment the micro address counter 112 once for every two signals. When the word count in the micro address counter 112 equals the word count in latch 113, the comparator circuit 114 generates a signal to buffer gate 115 that will cause pointer circuit 116 to switch the connection to the other FT memory 100 by enabling and disabling the appropriate buffers 101–108.

Upon reading the first byte of input file data the system processor 11 or adapter module 19 will be locked on the particular FT input memory and the pointer circuit will not be switched as represented by the disable signal from circuit 117 to circuit 115. Circuit 117 is responsive to signals on the backplane read (RD) line to disable the buffer 115. This means the CPU 31 will have to transfer further files to the other memory 99 or 100.

The system processor 11 initiates an input file transfer through the backplane by writing a module control byte (MCB) to a register in circuit 52 in FIG. 5. This circuit 52 is connected to the interrupt generator circuit in FIG. 9 to generate an MCB RECEIVED interrupt to the CPU 31. The CPU 31 then reads the MCB and has sixty-eight microseconds to return an appropriate module status byte (MSB) to a latch in circuit 52. From there the MSB is read through the backplane.

The signals on the backplane read (RD) line will increment the backplane address counter 109 once for every two bytes read. The MSB has been loaded into latch 110. As bytes of input file data are read, a checksum is calculated in the checksum circuit 118. When the word count in the backplane address counter 109 equals the word count in the MSB latch 110, the comparator circuit 111 generates a WORD COUNT MATCH signal to the checksum circuit 118 to enable a checksum to be read through the backplane. The checksum circuit 118 will also transmit a CHECKSUM SENT signal to the interrupt generator circuit 98 to generate an INPUT FILE SENT interrupt to the CPU 31.

This completes the description of the backplane interface circuit 33 and its subcircuits. It should now be understood how the backplane interface circuit 33 relieves the microelectronic CPU 31 of much of the protocol handling and other processing associated with single byte transfers and file transfers. The backplane interface circuit 33 discriminates between single transfer data and module control bytes (MCB's) used to initiate file transfers. The file transfer input and output circuits 55 and 56 are enabled by signals for both existing system processors 11 and adapter modules 19 which do not provide an ADS signal and for newly developed system processors and adapter modules which provide an ADS signal.

In the example described in detail herein, the single file transfer data has comprised discrete I/O data representing the ON or OFF state of discrete I/O devices on a machine or process, while the file transfer data had comprised data representing many other diagnostic conditions related to the discrete I/O devices. It will be apparent to those skilled in the art that certain modifications can be made in the character of the data in other applications without departing from the scope and teachings of the invention. For the example in modules for controlling word-oriented devices, certain data words may be downloaded in the file transfer data. Other simple commands such as start and stop can be then transmitted in the single file transfer data which can be updated on a more frequent basis. The ability to transfer data in these two vastly different modes to the same I/O module is a significant advance over the known art.

I claim:

1. A method of communicating bytes of I/O data through a backbone between a backplane controller and an I/O module responsive to real time I/O data representing ON/OFF states of discrete I/O devices on a controlled machine or process, wherein the backplane controller includes means for generating a group of system I/O addresses to further generate a group of first backplane signals on the backplane that sequentially enable I/O modules in an I/O scan sequence to transfer bytes of real time I/O data between the backplane controller and the I/O modules, and wherein the backplane controller includes means for generating a second backplane signal in a first logic state and for generating the second backplane signal in a second logic state, the method comprising:

the I/O module transferring to or from the backplane, in response to receiving one of the first backplane signals generated on the backplane and in response to receiving the second backplane signal generated in the first logic state, at least one byte of discrete, real time I/O data representing the ON/OFF states of the discrete I/O devices; and the I/O module transferring to or from the backplane, in response to receiving a second occurrence of the one of the first backplane signals and in response to receiving the second backplane signal generated in the second logic state, a file of I/O data including I/O data indicating conditions for the discrete I/O devices that are distinguishable from the ON/OFF states of the discrete I/O devices.

2. The method of claim 1, wherein
the step of transferring the byte of discrete I/O data is carried out in response to receiving the one of the first backplane signals that is generated in response to a system I/O address which is generated for the I/O module during the I/O scan sequence; and
wherein the step of transferring the file of I/O data is carried out in response to receiving the second backplane signal generated in response to a system-level programming instruction for file transfer that includes a system I/O address that is the same as the system I/O address for which the byte of discrete I/O data is transferred during the I/O scan sequence.

3. The method of claim 1, wherein
the byte of discrete real time I/O data is associated with a first system I/O address;
wherein the file of I/O data is associated with a second system I/O address;
wherein generating the second backplane signal in the first logic state is in response to generation of the first system I/O address,
wherein generating the second backplane signal in the second logic state is in response to generation of the second system I/O address;
wherein the I/O module transfers, in response to the generation of the first system I/O address, the byte of real time I/O data representing the ON/OFF states of the discrete I/O devices; and
wherein the I/O module transfers, in response to the generation of the second system I/O address, the file of I/O data.

4. A backplane interface circuit for interfacing an I/O module to a backplane, wherein the I/O module is responsive to discrete I/O data representing ON/OFF states of discrete I/O devices on a controlled machine or process, and wherein the I/O module is responsive to a module enable signal on the backplane to transfer a byte of discrete I/O data to or from the backplane, the backplane interface circuit comprising:
byte transfer means for storing and transferring a byte of discrete I/O data which, during operation, is transferred to or from the backplane in a byte transfer mode;
file transfer means for storing and transferring a file of I/O data which, during operation, is transferred to or from the backplane in a file transfer mode;
a backplane enable circuit with logic means responsive to the module enable signal generated on the backplane to enable the backplane interface circuit for transfer of I/O data, the backplane enable circuit also including
decoding and enabling means responsive to a second backplane signal received from the backplane in a first logic state for enabling the byte transfer means to transfer a byte of I/O data to or from the backplane; and
wherein the decoding and enabling means is responsive to the second backplane signal in a second logic state for enabling the file transfer means to transfer the file of I/O data to or from the backplane.

5. The backplane interface circuit of claim 4, wherein the byte transfer means, the file transfer means, and the decoding and enabling means are included in a single integrated circuit.

6. The backplane interface circuit of claim 4, wherein the file of I/O data transferred to or from the backplane is a file of data indicating conditions for the discrete I/O devices that are distinguishable from the ON/OFF state of the discrete I/O devices.

7. The backplane interface circuit of claim 4, wherein the discrete I/O data is associated with a first system I/O address;
wherein the file of I/O data is associated with a second system I/O address;
wherein the decoding and enabling means includes means for recognizing the second backplane signal in the first logic state as a first byte address signal generated in response to the first system I/O address;
wherein the decoding and enabling means includes means for recognizing the second backplane signal in the second logic state as a second byte address signal generated in response to the second system I/O address;
wherein the decoding and enabling means responds to the first byte address signal to enable transfer of the byte of discrete I/O data; and
wherein the decoding and enabling means responds to the second byte address signal to enable transfer of the file of I/O data.

8. An integrated circuit for I/O modules of programmable controllers for communicating through a data bus a file of I/O data representing conditions related to discrete I/O devices on a controlled machine or process, the integrated circuit comprising:
first data transfer circuitry for storing and exchanging real time I/O data representing ON/OFF states of the discrete I/O devices;
second data transfer circuitry for storing and exchanging a file of I/O data indicating conditions which are distinguishable from the ON/OFF state of the discrete I/O devices; and
an enabling circuit connected for enabling the first data transfer circuitry, the enabling circuit being connected during operation to an I/O module enable line to receive a first enabling signal, and the enabling circuit being responsive to the first enabling signal to enable a byte of real time I/O data representing ON/OFF states of the discrete I/O devices to be transferred between the data bus and the first data transfer circuitry; and
wherein the enabling circuit is also connected for enabling the second data transfer circuitry, the enabling circuit being connected during operation to the I/O module enable line to receive the first enabling signal and to a second enabling line to receive a second enabling signal and wherein the enabling circuit is responsive to the first and second enabling signals to enable the file of I/O data to be transferred between the data bus and the second data transfer circuitry.

9. An integrated circuit for I/O modules of programmable controllers and responsive to signals generated by a backplane controller for communicating two types of I/O data through a backplane data bus on a backplane, the integrated circuit comprising:
first means for receiving an I/O module enable signal generated through the backplane in response to decoding of an I/O module address by the backplane controller;

wherein the first means includes second means for receiving first byte address signals and second byte address signals generated through the backplane in response to operation of the backplane controller;

wherein said second means generates first enable signals in response to the first byte address signals and said second means generates second enable signals in response to the second byte address signals;

third means coupled to the second means for enabling a first byte of real time I/O data representing ON/OFF states of a group of discrete I/O devices to be communicated over the backplane data bus in response to receiving the first enable signals from the second means; and fourth means coupled to the second means for enabling a second byte of I/O data representing conditions about one discrete I/O device which are distinguishable from the ON/OFF state of the discrete I/O device to be communicated over the backplane data bus in response to receiving the second enable signals from the second means.

* * * * *